US006737099B2

(12) United States Patent
Guraya

(10) Patent No.: US 6,737,099 B2
(45) Date of Patent: May 18, 2004

(54) PROCESS FOR THE DEAGGLOMERATION AND THE HOMOGENEOUS DISPERSION OF STARCH PARTICLES

(75) Inventor: Harmeet S. Guraya, New Orleans, LA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/819,992

(22) Filed: Mar. 29, 2001

(65) Prior Publication Data

US 2003/0026888 A1 Feb. 6, 2003

(51) Int. Cl.⁷ .................................................. A21D 2/00
(52) U.S. Cl. ......................... 426/622; 426/93; 426/656
(58) Field of Search ........................... 426/622, 93, 656

(56) References Cited

U.S. PATENT DOCUMENTS

| 4,217,414 A | * | 8/1980 | Walon |
| 4,416,701 A | | 11/1983 | Huster et al. ................. 127/68 |
| 5,410,021 A | | 4/1995 | Kampen ..................... 530/372 |
| 5,556,655 A | * | 9/1996 | Vadlamani et al. |

FOREIGN PATENT DOCUMENTS

| DE | 4428933 | 2/1996 | ........... C12P/21/00 |

OTHER PUBLICATIONS

Juliano, B.O., "Rice Starch: Production, Properties, and Uses", In Starch: Chemistry and Technology, pp. 507–525, 1984.

Mueser, F., et al., "The Use of High–Pressure Disintegration Technique for the Extraction of Starch from Corn", New Approaches to Res. on Cereal Carbohydrates, pp. 161–181, 1985.

* cited by examiner

Primary Examiner—Anthony Weier
(74) Attorney, Agent, or Firm—John D. Fado; Evelyn M. Rabin

(57) ABSTRACT

Slurries of amylaceous flour from milled seed of cereals, beans, and legumes containing dispersed particles of starch-protein agglomerates are subjected to high pressure processing to obtain deagglomerated starch granules and protein. Further treatment of the deagglomerated product leads to the recovery of a novel protein-coated starch product or to the isolation of starch and protein of high purity and quality. The method greatly improves the recovery of starch during classification/separation from protein and is therefore economical. Starch reduced to individual granules, with low starch damage, low protein content, and with improved pasting characteristics, can be produced using this deagglomerization method. The protein obtained by the process has better solubility and is therefore suitable for beverage applications.

30 Claims, 26 Drawing Sheets

Waxy or Non-waxy Rice
Broken or Whole
+
Water
↓
Hydration for 30 Minutes
↓
Bauer Mill
↓
Colloid Mill
↓
↓

Waxy and Non-waxy Rice
Broken or Whole
↓
Dry Milling to a Predetermined Mesh
↓
Rice Flour
+
Water
↓
Hydration for 15 Minutes
↓

↓
Rice Slurry
↓
Microfluidizer
↓
Separation
↓
∧
Starch   Protein
↓        ↓
Purification Purification
↓        ↓
Drying   Drying

PROCESS FOR THE DEAGGLOMERATION AND THE HOMOGENEOUS DISPERSION OF STARCH PARTICLES

BACKGROUND OF THE INVENTION

1. Field of the Invention

This invention relates to an efficient "natural-type" method of physically disrupting, under high pressures, starch-protein agglomerates in aqueous slurries of partially processed grains and non-cereal vegetable seeds by use of an apparatus, such as a microfluidizer, which imparts shear, cavitation, and impact. Deagglomeration under the conditions of the invention facilitates the isolation of starch and protein of high purity and quality, and renders possible the recovery of novel protein-starch combinations. Further, the invention is directed to starch and protein products obtained by the process.

2. Description of the Relevant Art

Commercial preparation of starch from grains such as rice has been practiced on a limited scale in the United States. Commercial preparation of rice starch has been described by Hogan (1967. In Starch: Chemistry and Technology, Whistler et al. (Eds.). Academic Press, Orlando, Fla., p. 65). There has been little change in the process since the 1960's., e.g., the wet milling process for rice has remained essentially the same for decades. The process consists of steeping broken rice in 0.3–0.5% sodium hydroxide solution for a period of 24 hrs at room temperature to 50° C. The steeped rice is ground or wet milled. The starch suspension is then stored for an additional 10–24 hrs followed by centrifugation to recover the starch which is further washed with water then dried. Protein is extracted and recovered by neutralization with acid to the isoelectric pH of protein (pH 6.4). The precipitate is allowed to settle and is recovered in filter presses or centrifuges (Cagampang, et al. 1966. *Cereal Chem.* 43: 145). Although this process for the separation of rice starch and rice protein has been well known and practiced in the art, certain disadvantages have been found to be associated with these types of processes. The disadvantages are that the sodium hydroxide degrades the protein component leading to the formation of small peptides which can cause bitterness and thus a product not suitable for human consumption, that these processes are water-, energy-, and time-intensive and require costly treatment of the wastewater generated, and further, that usage of alkali and the resulting salt disposal problem is an environmental concern.

A number of other laboratory methods have been used for rice starch and protein separation (Hogan, J. T., supra; Juliano, B. O. 1984. In Starch: Chemistry and Technology, $2^{nd}$ Edition, Whistler et al. (Eds.). Academic Press, Orlando, Fla., pp. 507–525). In addition, rice starch and protein can also be separated by use of an emulsifier (Kung et al. 1987. *J. Chinese Agri. Chem. Soc.* 25: 299–307). More recently, Bartsch et al. also described a process of recovering starch and protein from rice which involves comminuting under wet or dry conditions, soaking in an aqueous solution at pH 9, adding enzymes before or during soaking, and homogenizing during or after soaking (DE4428933, Feb. 22, 1996). The homogenization is carried out under indeterminate pressure conditions in an ultrasound device, a microcavitation disintegration apparatus, a colloidal mill, or a procedure involving screening combined with a displacement pump.

Several techniques of isolation of starch and protein from corn and other grain products have been disclosed in the patent literature, but these too are associated with certain disadvantages. Most of the isolation techniques are related to corn wet milling and use chemicals to extract the protein fraction. Two patented processes which are drawn to the physical aspects of starch-protein matrix breakdown are Kampen (U.S. Pat. No. 5,410,021, Apr. 25, 1995) and Huster et al. (U.S. Pat. No. 4,416,701, Nov. 22, 1983).

Kampen describes the process of mechanically breaking protein starch down by wet attrition milling. The grain particles, specifically corn, are milled to particle size sufficiently small to break the bond between starch and protein and sufficiently large to retain substantially all of the starch granules intact. The protein is then extracted with ethanol and alkali solvents, separated and dried to form protein and/or protein isolate. The intact starch granules are cleaned and dried. The attrition mill described in the patent consists of two carborundum disks with one rotating at a high speed and the other stationary. The particle size reduction is limited to the clearance between the disks; therefore, once the clearance is set at more than the particle size of the largest granule, separation of smaller granules still imbedded in the protein matrix will not take place. The process relies on chemical extraction of protein to produce intact starch granules.

Huster et al. describe a wet process of a communation of the steeped raw material in a high pressure apparatus equipped with a splitter head or a disintegration valve. The process differed from earlier procedures in that the steeping process was performed under low pressure (145–218 psi) thereby considerably shortening the steeping time to three hours or less and the steeped material was then subjected to an optimum pressure of 1450 psi in a high pressure apparatus equipped with a splitter head or disintegration valve. The certain drop in pressure produced by passing a material through a small slit subjects it to high acceleration and considerable impact and mechanical strain. Pressures of at least 145 psi and an optimum pressure of 1450 psi are recommended for breakdown of morphological structure between starch grain and protein matrix. Further, in the case of corn, the use of the splitter head required multiple passes for complete disintegration.

Later studies by the group (Meuser et al. 1986. Cereals in a European Context/First Eur. Conf. On Food Sci., pages 285–299; Meuser et al. 1985. New Approaches to Research on Cereal Carbohydrates, Hill et al., Eds. Elsevier Science Publishers, Amsterdam, The Netherlands, pages 161–180) disclose that a steeping time of 12 hours at atmospheric pressure or 4 hrs at 218 psi, sometimes in the presence of $SO_2$, is required for corn and other grains and vegetables prior to high pressure (1450 psi) processing in the splitter head apparatus and that the distribution of particle sizes changes after multiple passes through the disintegration valve. The first passage through the disintegration valve results in most particles being concentrated in the 28–160 $\mu$m range, the second passage results in 8% of the fraction being particles>63 $\mu$m, and after the fourth passage, particles were observed to be at different stages of decomposition, ranging from intact particles to complete structural disintegration. Further, this technology using low pressure homogenization might not be suitable for the production of rice starches due to the small granule size and the different chemistry of the starch-protein matrix.

Rice products are used in many applications, particularly as food ingredients. Rice starch is useful for, among other uses, to improve texture, to maintain freeze-thaw stability, and to improve moisture retention of food products. Rice starch is used as a fat mimetic to reduce fat and caloric content in food products. Rice products are used in baby food preparation based on their digestibility and absence of gluten. Rice protein, in its non-degraded form, is both hypo-allergenic and nutritionally valuable. Being a very fine powder, rice starch also has other applications including use as a cosmetic dusting powder, laundry stiffening agent, paper and photographic paper powder, sugar coating, confectionary, and excipient for pharmaceutical tablets.

The quality of the starch recovered from grains such as rice or some vegetables is determined by the amount of residual protein, by the relative absence of starch-starch and starch-protein agglomerates, and by a low percentage of starch damage. For example, for rice starch to perform best as a fat mimetic, the starch should be predominantly present in the form of individual granules. If a physical process of separation for rice flour, for example, could be developed in which the rice protein could be separated from the starch without contact with chemicals and without embitterment, the existence of a second value-added product would improve the overall economics of the production process. The successful development of a commercial process to manufacture a reasonably priced "all natural" rice starch and rice protein would allow for the development of a new industry and new markets for rice.

SUMMARY OF THE INVENTION

We have discovered that slurries of amylaceous flour from milled seed, which contain dispersed particles of starch-protein and starch-starch agglomerates, can be subjected to high pressure processing to obtain deagglomerated starch and protein. The resultant deagglomerated material is essentially individual, intact starch granules and protein homogeneously dispersed in a liquid matrix. The substantially unadulterated condition of the deagglomerated materials is such that they can be further treated to yield starch and protein fractions of a high purity, improved quality, and superior market value as compared to fractions produced by other methods.

In accordance with this discovery, it is an object of the invention to provide a novel high pressure process for the treatment of partially processed grains and vegetables which results in the deagglomeration of the starch and the protein while still ensuring and maintaining the integrity and quality of the two components, starch and protein. It is an object of the invention to provide a method for processing a starch slurry under high pressures, a method wherein starch containing agglomerated particles are deagglomerated and then individual starch granules and the protein resulting from the deagglomeration are homogeneously dispersed in a liquid matrix. Amongst other things, the product resulting from the deagglomeration procedure can be utilized in its aqueous form, dried to a fine powder, or further subjected to separation procedures, as for example, density-based or particle size separation techniques to yield the recovery of starch and protein fractions. In particular, a method is provided by which rice slurry containing starch-starch and starch-protein agglomerates is subjected to processing in a microfluidizer resulting in deagglomerated rice starch granules and rice protein homogeneously dispersed in a liquid matrix.

In a preferred embodiment of the invention, waxy and non-waxy rice is treated to yield a rice starch and protein.

Other objects and advantages of the invention will become readily apparent from the following description.

BRIEF DESCRIPTION OF THE DRAWINGS

FIGS. 6a and 6e are electron micrographs of the 120 mesh product, prior to microfluidization. FIGS. 6b and 6f depict the completely deagglomerated microfluidized product showing the individual starch granules of waxy and non-waxy flour, respectively. FIGS. 6c and 6g show the effects of spray drying the microfluidized starch granules; the protein dries on the starch and the granules reagglomerate. The coated rice granule agglomerates are deagglomerated to produce waxy (FIG. 6d) and non-waxy (FIG. 6h) starch particles coated in protein.

FIG. 7a shows 120 mesh non-waxy flour; 7b, starch produced by microfluidizing 120 mesh non-waxy flour; 7c, spray-dried microfluidized non-waxy flour; and 7d, spray-dried non-waxy flour pin milled four times.

FIG. 8a shows 120 mesh waxy flour; 8b, starch produced by microfluidizing 120 mesh waxy flour; 8c, spray-dried microfluidized waxy flour; and 8d, spray-dried waxy flour pin milled four times.

DETAILED DESCRIPTION OF THE INVENTION

The starch-containing agglomerates are processed in a "microfluidizer" to obtain deagglomeration and the homogeneous dispersion of individual starch granules and protein.

Figure 1:
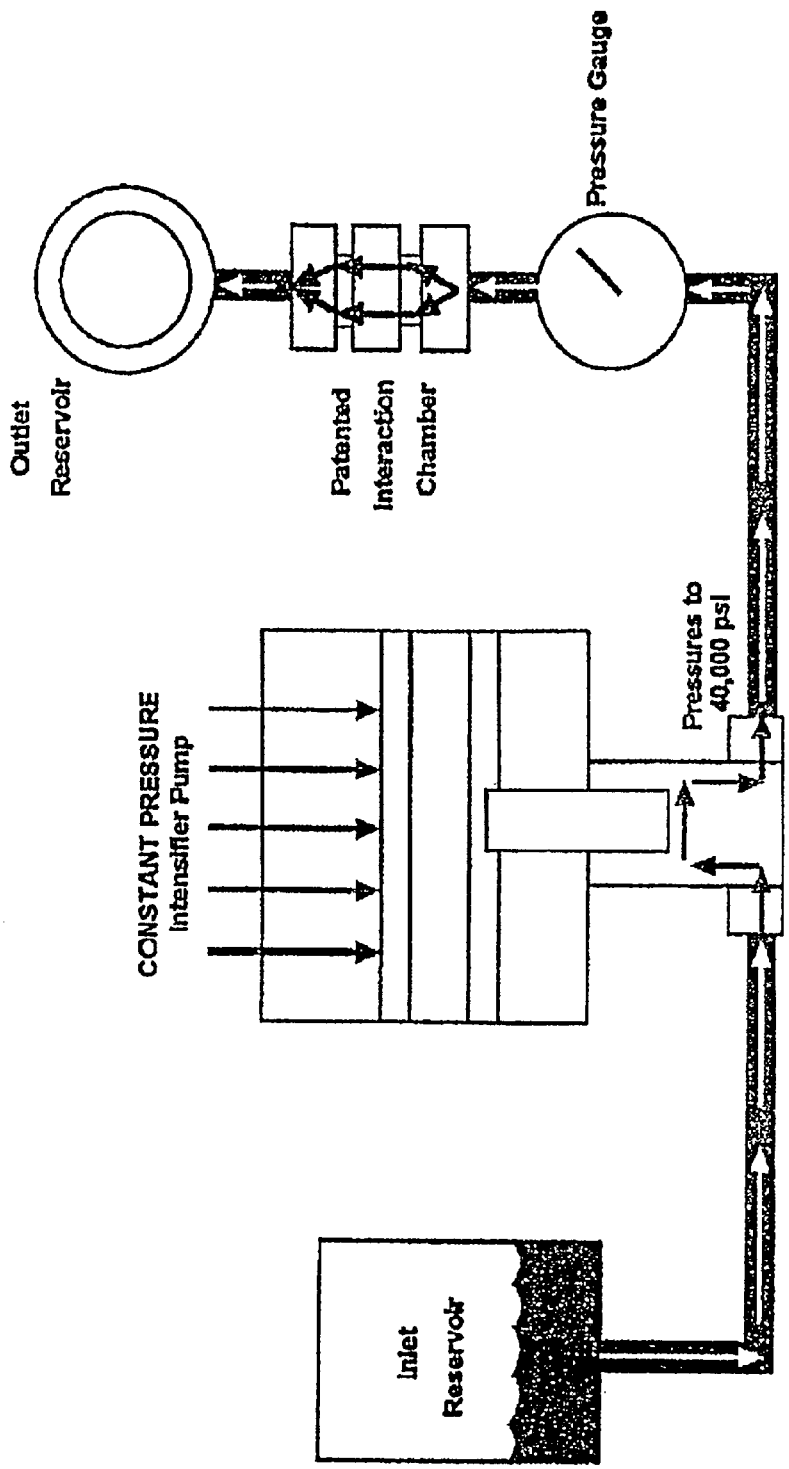
FIG. 1 shows a flow diagram of a microfluidizer useful for carrying out the process of the invention.

The preferred devices for practicing the process of the invention are those disclosed in U.S. Pat. Nos. 4,533,254 ('254 patent) and 4,908,154, the disclosures of which are hereby incorporated by reference in their entirety. The especially preferred microfluidizer is a device of the '254 patent manufactured by Microfluidics Corp., Newton, Mass., under the name Microfluidizer®), FIG. 1. The Microfluidizer® is an apparatus which relies on interparticle collision at high pressure for the breaking of particles. Fluid pressures typically range from 2000 psi to 30,000 psi with some production size microfluidizers capable of handling pressures up to 40,000 psi.

Briefly, the Microfluidizer® comprises a high pressure pump which is used to force an aqueous slurry through an interaction chamber. As the liquid stream is propelled forward at high pressure into the interaction chamber, the liquid stream enters the interaction chamber through an inlet having a predetermined diameter, resulting in increased pressure conditions as the slurry passes through the inlet. The liquid stream is then split into at least two laminar streams by a stream splitter. Each stream, and thus product, is pressure-fed into channels in the interaction chamber block and shearing forces are applied to the liquid stream along the walls of the channels. The channels are configured to draw the respective laminar streams, first away from one another and then toward one another. The streams converge and impact upon each other at high pressure in a space that has a cross-sectional area and volume that is relatively larger than that of the two channels. This rapid change in cross-sectional area and volume results in sufficient pressure decrease to cause vaporization and thus cavitation in the fluid stream. The formation and collapse of vapor bubbles occurring violently over a short time period leads to intense cavitational stress. The impaction results from the particle—particle collisions between the two opposing liquid streams at high pressure and high velocity as a single stream is reformed. The collision of streams of liquid slurry necessarily involves the collision of the particles within the streams. Particles (agglomerates) impact other particles (agglomerates); any solid agglomerates are deagglomerated. The forces of shear, cavitation, and impact, as described above, are generated in the interaction chamber and act on the fluid streams to achieve particle size reduction and uniform distribution. Although the exact mechanism and the contribution of each type of stress (shear, cavitation, and impact) to the overall outcome has not been clarified in the art, the effects of such stresses can be precisely controlled by altering pressures, chamber design, and numbers of chambers, streams, and pressure pumps, for example. Methods of altering the design and operating procedures of a Microfluidizer® are well known to those in the art. Therefore, the terms "microfluidization" and "microfluidize" are used herein to refer to a process comprising at least shear, cavitation, and impact, particularly impact as occurs between agglomerates when at least two liquid streams of agglomerates collide at high pressure and high velocity and involving a finely particulated suspended solid being caused to behave in a manner of a fluid; the term "microfluidizer" is used herein to refer to an apparatus that is utilized to "microfluidize" and for "microfluidization". The term Microfluidizer® is a microfluidizer manufactured by Microfluidics Corp., Newton, Mass.

It is preferred to utilize the Microfluidizer® in the method of deagglomeration/dispersion under high pressure. However, other types of devices having an alternative design can be utilized, devices which either alone or in combination impart the stresses of shear, impact, and cavitation as is found in the Microfluidizer® and which achieve the same results, i.e., deagglomerization of the starch-protein agglomerates with minimal starch damage and the homogeneous dispersion of individual starch granules and protein in a liquid matrix. It is envisioned that the microfluidization can also be carried out in certain homogenizing devices capable of operating under the temperature and pressure requirements of the invention, such as a Rannie High Pressure Homogenizer (APV Corp., Wilmington, Mass.) or a Rotor-stator homogenizer (Silverson L4R). The microfluidization is conveniently carried out in a high pressure homogenizer, typically operated at pressures in the range of about 3,000 up to 30,000 psi. Preferably, such processes are carried out at pressures in the range of about 9,000 up to about 15,000 psi. The resulting product comprises protein and discrete granules of starch in a liquid matrix. In addition to high pressure homogenization, processes imparting high shear such as high shear mixers, hydroshear mixers, ultrasonic mixers, colloid mills, mixer homogenizers, sonication, high shear impellers, cell disrupters, and water jets, used alone or in combination with high pressure homogenization devices are encompassed by the invention to the extent that their use results in the deagglomeration of starch-containing particles and the homogeneous dispersion of individual starch granules and protein in a liquid matrix as a consequence of "microfluidization".

A recycling of the aqueous suspension in the microfluidizing device as described in the aforementioned patents may be done to further reduce the size of the agglomerated particles and/or to make them fall into a particular size range, i.e., until the desired level of deagglomeration is achieved. Efficiency and capacity can be controlled by adjusting the design of the microfluidizer, as for example, by increasing the number of interacting streams in the chamber and by utilizing varying numbers and types of chambers.

Most microfluidizer chambers are categorized as being Y- or Z-shaped chambers. Z chambers are typically positioned downstream of one or more Y chambers; the Z-type chamber provides back pressure ensuring that a Y chamber performs optimally. Preliminary results obtained from processing rice showed that there was an increase in rice damage when rice flour slurry was processed exclusively in Z chambers, possibly due to the slurry impacting the solid stainless steel walls. When starch is damaged, lower molecular weight starch chains are liberated through shear and then are randomly dispersed and rendered instantly soluble. Thus, increased starch damage correlates with an increase in starch solubility. Similar type damage would be expected when pressure drop homogenizers having disintegration valves are used. In contrast, in the Y chamber, two similar streams of rice slurry moving at different velocities impact each other. The particle—particle impact occurring upon collision of the two streams effects the desired deagglomeration and starch damage is minimized. For this reason, the Y configuration is preferred as the principal reaction chamber.

When chambers are combined, an increase in pressure may be required because there is a pressure drop associated with each additional chamber. It is within the purview of one practicing the art to select the exact conditions to obtain the desired effect.

To ensure clean separation of protein from starch, starch-protein agglomerates must be deagglomerated and the resulting deagglomerated components separated from each other. All, or substantially all, of the agglomerated starch particles (starch-starch and starch-protein agglomerates) must be reduced to individual starch granule size, that is, the size of discrete starch granules. Herein, the "size" of the starch particle is usually expressed as the size of the "hydrated" starch particle. The size is measured when the starch particles are hydrated, since the processes and separations occur in an aqueous slurry. The size chosen should encompass the majority of individual starch granules. Using rice as an example, the average particle size of hydrated rice is five microns. However, the size of individual starch granules from rice actually fall within a range from about one micron to about twelve microns. Depending on the grain being processed, agglomerates may encompass other components in addition to starch and protein, for example, starch/protein/fiber or starch/protein/oil. As used herein, the term "isolated starch" or "isolated protein" is intended to refer to starch or protein which is separated from other grain components.

If particle size reduction is incomplete or if the range of sizes of the particles does not appear to follow an essentially normal distribution pattern, then starch-protein agglomerates can remain in the starch fraction after centrifugation, thereby increasing the protein concentration of the starch. In such circumstances, despite any number of washings, the protein concentration of the starch fractions will not decrease to the level attained when all the deagglomerated protein is removed. To achieve complete separation from protein and thus obtain a pure starch product, it is extremely important that complete particle size reduction occurs. Further, because intact starch granules have more commercial value, damage to the starch granules must be minimized. The product resulting from the deagglomeration procedure of the invention is essentially individual starch granules and protein in a liquid matrix. It is noted however that the method of the invention can also be used in those situations where complete processing yielding individual starch granules is not required, e.g., where the advantage of reduced damage to the starch is desired, but where optimal separation of starch and protein is not required.

In order for the microfluidizer to accomplish the deagglomeration and dispersion processes most efficiently, the starch-containing particles of starting material (grains, smooth peas, or beans) must first be partially processed. Herein, "partially processed" is used to describe starting material where the initial particle size has been reduced by means of a physical/mechanical preparatory treatment to a size compatible with a microfluidizer, e.g., to a certain mesh. The initial size-reduction process can utilize dry milling size reduction equipment and/or wet milling size reduction equipment. Water, or another aqueous medium, is added both for the purpose of hydrating the starch, and also for making a flow stream compatible with the microfluidizer. The step of milling comprises milling particles of grain or grain flour to the point that a flow stream can be maintained, a point usually occurring when substantially none of the particles exceed about 250 microns. The particles are preferably of the 120 mesh size or about 125 microns or less. Larger particle sizes obtained from, for example, prescreening on 80 mesh can result in clogging of the microfluidizer. However, large particles, such as those of 250 microns, can be pushed through the microfluidizer by utilizing increased pressure.

"Partially processed" does not encompass such pretreatment procedures as is required for processes described in the "Description of Relevant Art" section, i.e., pretreatment with chemicals, such as ethanol or alkali solvents, to extract the protein fraction; with enzymes; with alkali for raising the pH to facilitate the enzyme digestion or the fragmentation of structure; or likewise, with acids or $SO_2$, for pH adjustment or for facilitating digestion or fragmentation. Chemical treatments are not required to enable this novel process, which can essentially be described as a "natural process". While non-chemically treated starting material is preferred, this method does not preclude using chemically or enzymatically pretreated starting material. Such starting material can be used under those circumstances where "natural processing" is not required; as for example, when protein quality is not the primary focus, but where particular advantages of this "microfluidization" process would prove useful, e.g., where reducing starch agglomerates in size, to substantially individual starch granule size, with minimal starch damage is desired.

Figure 2:
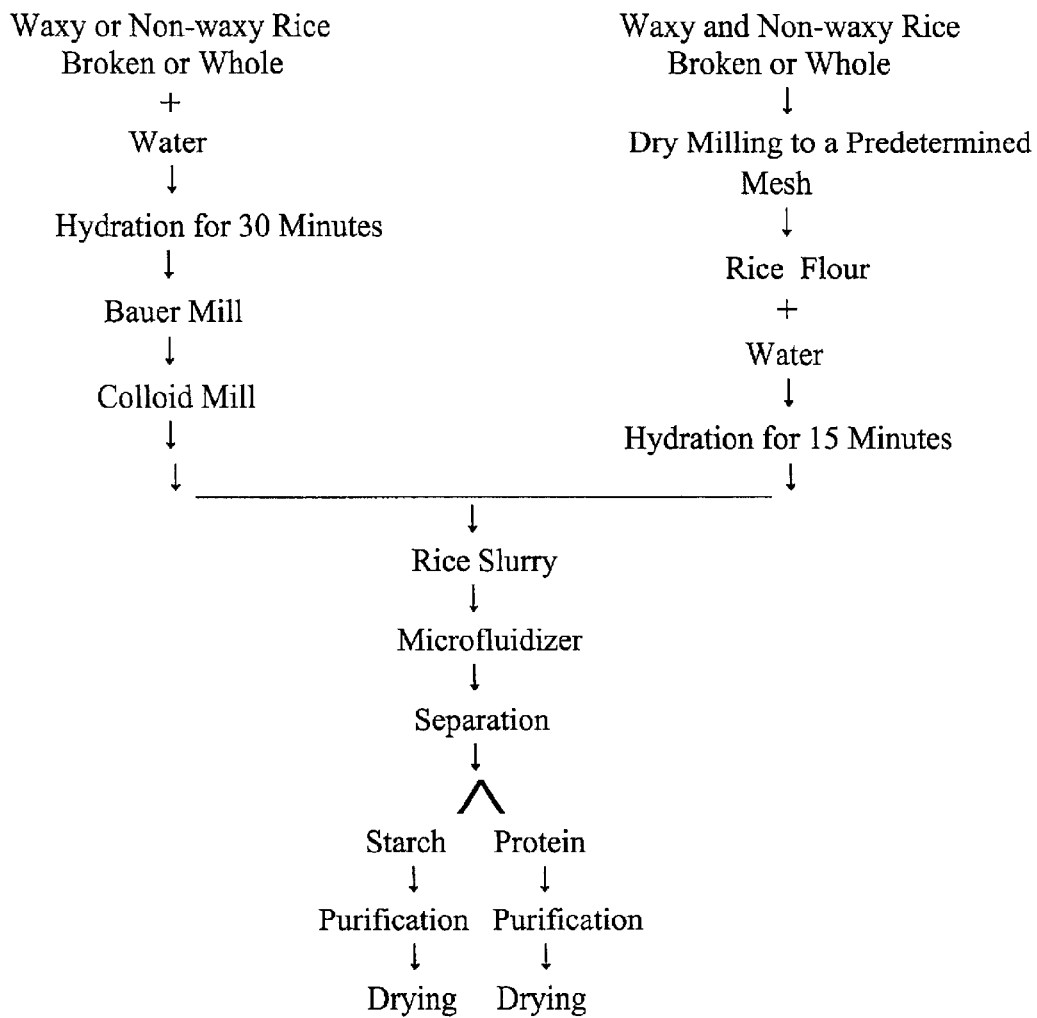
FIG. 2 is a flow chart illustrating dry- and wet-milling options used in conjunction with the process of the invention.

FIG. 2 illustrates alternate pretreatments that may be used with waxy and non-waxy rice prior to microfluidization. The process as described can be a wet milling process (left) or a dry milling process (right). When the dry process is practiced, whole rice is first reduced to a predetermined particle size using a pin mill or other size reduction equipment. The resulting flour is then hydrated with water to make a flow stream compatible with the microfluidizer. When the wet milling process is practiced, the starting material, whole rice or broken rice, is hydrated and then passed through size reduction mills until a particle size is obtained which ensures a flow stream compatible with the microfluidizer.

The method described supra can be used to process amylaceous flour from milled seeds, including rice flour and other grain flours such as corn, oats, sorghum, barley, wheat, rye, millet, as well as some vegetable seeds, such as smooth pea and some beans, e.g., soybean, kidney, garbanzo, black. Other grains may be appropriate for deagglomeration by this method as readily determined by a person in the art.

Following microfluidization, the deagglomerated material can be utilized in its aqueous form or subjected to density-based separation procedures to separate the purified protein and starch products or to drying procedures to generate protein-coated starch granules. One of skill in the art may elect under some circumstances to include an additional size-separation step between the microfluidization and the density-based separation steps. In those circumstances, over- or under-sized particles can be removed by size-separation techniques such as sieving, centrifugation, hydrocyclone treatment, and/or pressure screening.

The deagglomeration achieved as a result of microfluidization leads to better density-based separation of starch and protein. Using the microfluidizer results in the recovery of starch deagglomerated to individual starch granules. The starch product recovered after microfluidization is no longer agglomerated to the protein; therefore, after centrifugation/separation, the starch product is primarily starch. The amount of protein present in the starch product is low (i.e., significantly lower than that present in the starting material and also low for this type of "natural processing" where chemicals and enzymes conventionally used in the prior art are not used and where separation can be still further improved by utilizing such apparatuses as are routinely used in commercial operations, e.g., hydrocyclones). The starch obtained after separation maintains pasting characteristics of the original starch and exhibits less starch damage than a starch product resulting from processing methods employing previous art-utilized physical or mechanical disruption, as measured by susceptibility to digestion with amylase or by determination of granule integrity by scanning electron microscopy.

The protein obtained using the process has no bitterness, i.e., the bitterness associated with enzyme and chemical treatments is absent. Thus, the protein generated from this process is suitable for human consumption. Further, the protein product exhibits increased solubility as compared to protein products resulting from processing methods employing previous art-utilized physical or mechanical disruption methods to process identical starting material. The protein product having increased solubility can therefore be utilized in beverage applications. The existence of this second value-added product improves the overall economics of the production process which may lead to ability to manufacture, for example, reasonably priced "all natural" starch and protein.

In an alternative embodiment, the microfluidized, deagglomerated material comprising deagglomerated starch granules and protein homogeneously dispersed in a matrix can be subjected to spray-drying procedures leading to a high quality starch/protein product, protein-coated starch granules. Herein, the terms "coats" and "coated" encompass the protein forming either a continuous or a discontinuous coating on the starch granules. In addition to spray-dryers, other types of dryers can be utilized to generate protein-coated starch, such as, for example, tunnel dryers, flash dryers, ring dryers, and multi-rotor cell mill/dryers. Further, the protein-coated starch product can vary with respect to the amounts of protein and starch in the protein-coated starch product, such as by enriching with additional protein or other ingredients prior to the spray-drying procedure.

EXAMPLES

The following examples serve as further description of the invention and methods for practicing the invention. They are not intended as being limiting, rather as providing guidelines on how the invention may be practiced.

Tests conducted to determine physico-chemical properties of the starch and protein fractions and of the protein-encapsulated starch included analyses of particle size, total protein, and protein solubility as described below; scanning electron microscopy (described below); starch damage (AACC Method 76-30A), pasting properties (MCC Method 61-02), and analysis of moisture (AOAC Official Method 925.09).

Particle Size Analysis

Particle size analysis of starch was analyzed on the Coulter Small Volume Module Model LS230 particle size analyzer. 1.5 g of starch was combined with 10 ml of deionized water and vortexed. The diluted starch slurry was added into the sample port until the instrument read 45% PIDS (Polarization Intensity Differential Scattering) or 10–14% Obscuration. Water was used as the suspension fluid within the instrument. Since hydrated rice starch has a maximum particle size of 10 microns, particle size was reported as the percent of particles having a size below 10 microns to indicate whether complete agglomerate breakdown had been achieved.

Protein Analysis

Protein analysis was done on the three fractions; the supernatant, the protein fraction, and the starch fraction using the LECO Protein Analyzer (Model FP-2000, LECO Corporation, St. Joseph, Minn.). The instrument was calibrated using glycine according to the company-recommended protocol. The value for % Nitrogen was multiplied by 5.95 to obtain the % protein.

Protein Solubility Analysis

Protein solubility was measured by dissolving 0.05 g protein in 25 ml water at pH 3, 4, 5, 6, 7, 8, and 10. The suspension was stirred on a magnetic stirrer for 15 min, followed by centrifugation (Sorvall RC-5C Plus, SLA-1000 rotor, Dupont, Newton, Mass.) at 14,237 g. The supernatant was filtered through Whatman #4 filter paper and the filtrate was analyzed for total protein using the Bio-Rad DC Protein Assay kit (Bio-Rad Laboratories, Hercules, Calif.).

Scanning Electron Microscopy

Scanning electron microscopy (SEM) was conducted using a Hitachi Model S-510. Starch samples were dried in a vacuum oven (AOAC Official Method 925.09). Double sided tape was placed on the stub. The stub was dipped into the sample and tapped once to remove loose starch granules. The samples were placed in a Hummer II sputter coater and coated with 20–30 nm of gold/palladium, and examined by SEM.

Example 1

Waxy and non-waxy rice flours (RF-W1120 and RF-LO120, respectively) and whole rice was obtained from Sage V Foods, Freeport Tex. and milled to 120 mesh flour in order to maintain a consistent flow stream entering the microfluidizer.

A Model 110-T Microfluidizer® (MFIC Corporation, Newton Mass.) was equilibrated using water. The Microfluidizer® was equipped with two chambers: F20Y and H230Z. Waxy and non-waxy flour slurries at concentrations of 22%, 32%, and 36% (wgt/vol) in water were passed twice through the Microfluidizer® at 14500 psi. Samples were collected from each pass for further analysis. After microfluidization, the rice slurry was passed through ice-cooled cooling coils to remove any heat added during microfluidization.

The slurry is recycled through a microfluidizer homogenizer until the average particle size is reduced to less than 10 microns or until all the agglomerates have disintegrated. The degree of deagglomeration produced is a function of the pressure and velocity involved in the microfluidization and of the selected concentration of rice starch slurry.

The effects of starch type, concentration of starch, and number of passes of the rice flour slurry through the microfluidizer on starch damage and particle size were determined (Table 1). Whether complete deagglomeration was achieved was determined from a particle size analysis using the method described above. It was observed in preliminary trials that when starch-protein agglomerates are completely broken, all particles are below 10 microns. With rice, it is known that the range of the sizes of individual starch granules varies according to the rice variety being processed. Therefore, "maximum size" given for an input size or target size, as for example here "<10 microns", would vary with the rice variety. Rice varieties and physical properties of rice (e.g., size) are discussed by Juliano (supra). The value, <20 microns, encompasses all known rice varieties; however, improved varieties of the future may encompass yet larger individual granule size.

Starch damage was determined utilizing AACC Method 76-30A. Briefly, samples are treated with alpha-amylase. The amount of digestion observed in the sample as compared to the control is an indication of starch damage. Damaged starch is more easily digested than is undamaged starch.

TABLE 1

Effect of type of starch, concentration, and number of passes of the rice flour slurry through the microfluidizer at 14,500 psi on starch damage and particle size.

| Starch type | Conc. %* | % Starch Damage | | % Particle Size <10 microns | |
|---|---|---|---|---|---|
| | | Pass 1 | Pass 2 | Pass 1 | Pass 2 |
| Waxy | 22 | 4.62 ± 1.85 | 5.82 ± 0.30 | 95.95 ± 3.94 | 97.62 ± 0.26 |
| | 32 | 5.52 ± 0.38 | 5.79 ± 0.09 | 96.00 ± 0.88 | 98.81 ± 0.15 |
| | 36 | 6.29 ± 0.53 | 6.81 ± 0.43 | 93.43 ± 3.07 | 99.59 ± 0.31 |
| Non-Waxy | 22 | 5.90 ± 0.99 | 5.19 ± 0.33 | 86.41 ± 8.36 | 100.00 ± 0.00 |
| | 32 | 4.81 ± 0.29 | 5.30 ± 0.21 | 81.01 ± 11.41 | 99.91 ± 0.15 |
| | 36 | 5.28 ± 0.72 | 4.97 ± 0.33 | 88.24 ± 2.60 | 96.48 ± 4.10 |

*Concentration of solids

Rice slurry containing dispersed particles of starch-protein agglomerates (rice flour) when subjected to high pressure microfluidization leads to complete deagglomeration in one to two passes. When two passes through the microfluidizer were made with the waxy rice flour slurry, particle size reduction of 98% or better (at least 98% of the particles were reduced in size) was obtained with all concentrations. In case of non-waxy rice flour, the second pass through the microfluidizer achieved over 99% breakdown of agglomerates for the 22% and 32% slurries. However, when the 36% slurry was passed twice, only 96% starch-protein agglomerate breakdown was obtained. This suggests an upper concentration limit in the range of 32–36% for deagglomeration of non-waxy rice starch in a microfluidizer. This phenomenon was not observed with waxy rice flour at the same concentration. The difference may be due to waxy rice being much softer. The difference between the 36% waxy rice flour slurry and the 36% non-waxy rice flour slurry is seen after the first pass through the microfluidizer. A maximum of 93% starch-protein agglomerate breakdown was obtained in the case of the 36% waxy rice flour slurry, while only 88% starch-protein agglomerate breakdown was obtained with the 36% non-waxy rice flour slurry.

Starch damage increased as the concentration of the waxy rice flour in the slurry was increased (Table 1); however, the amount of starch damage is still considered to be low. The highest percentage of starch damage observed after two passes was 6.8%; most values were closer to 5–6%. Microfluidization results in less starch damage than the 7.93% and 8.2% starch damage observed in commercially available waxy and non-waxy starch, respectively.

Example 2

Rice slurry samples from the microfluidizer were collected in centrifuge tubes (250 ml capacity). Waxy and non-waxy rice flour, at various concentrations, was passed twice through the microfluidizer. Samples of the microfluidized slurry were centrifuged (Sorvall RC-5C Plus, SLA-1000 rotor, Dupont, Newton, Mass.) at 14,237 g for 10 min. The microfluidized rice slurry separated into three different layers upon centrifugation, i.e., supernatant, protein, and starch. The supernatant and protein layers were separated, placed into separate containers, and stored frozen at −40° C. until freeze dried (Labconco, Model 79480, Labconco, Kansas City, Mo.). The starch fraction was resuspended in water and centrifuged. The resuspension/centrifugation process was repeated. Supernatant from each centrifugation was freeze dried separately. Proteins from all centrifugations were pooled, then freeze-dried. After the last centrifugation and scraping, the starch was dried at 50° C. in a hot air convection oven for 24 hr.

The percent recovery of dried solids in each phase and percent protein in each fraction is shown in Table 2. Commercially available pure starch contains 0.0–1.0% protein. However, in the laboratory, classification/separation and washing cannot be done as efficiently as is achieved commercially by nozzle disc centrifuges followed by hydro cyclones. It is expected that by applying commercial-type separation and washing techniques to the material described above, the purity of the starch can approach that of commercially available starch.

TABLE 2

Effect of type of starch, concentration and number of passes of the rice flour slurry through the microfluidizer at 14,500 psi on protein and solids recovered.

| Starch | Conc* | % | Protein Fraction | | Starch Fraction | |
|---|---|---|---|---|---|---|
| | | | Pass 1 | Pass 2 | Pass 1 | Pass 2 |
| Waxy | 22% | Protein: | 34.81 ± 0.12 | 42.38 ± 0.06 | 3.26 ± 0.40 | 2.70 ± 0.62 |
| | | Solids: | 29.24 | 27.65 | 60.57 | 60.5 |
| | 32% | Protein: | 34.72 ± 0.85 | 39.17 ± 3.40 | 3.77 ± 0.37 | 2.20 ± 0.10 |
| | | Solids: | 13.16 | 13.7 | 75.98 | 74.15 |
| | 36% | Protein: | 31.86 ± 0.48 | 33.75 ± 1.74 | 4.11 ± 0.10 | 2.06 ± 0.15 |
| | | Solids: | 13.57 | 16.61 | 74.95 | 71.28 |
| Non-Waxy | 22% | Protein: | 35.08 ± 0.33 | 39.04 ± 0.24 | 3.74 ± 0.47 | 3.21 ± 0.81 |
| | | Solids: | 39.4 | 40.11 | 55.49 | 53.37 |

TABLE 2-continued

Effect of type of starch, concentration and number of passes of the rice flour slurry through the microfluidizer at 14,500 psi on protein and solids recovered.

| Starch | Conc* | % | Protein Fraction | | Starch Fraction | |
|---|---|---|---|---|---|---|
| | | | Pass 1 | Pass 2 | Pass 1 | Pass 2 |
| | 32% | Protein: | 31.11 ± 2.78 | 37.91 ± 2.06 | 4.01 ± 0.28 | 2.74 ± 0.33 |
| | | Solids: | 17.49 | 17.08 | 70.32 | 71.89 |
| | 36% | Protein: | 32.53 ± 1.14 | 37.78 ± 0.99 | 4.97 ± 0.33 | 3.26 ± 0.60 |
| | | Solids: | 16.39 | 17.86 | 77.38 | 74.01 |

*Concentration of solids

To make the process economical, the quantity of starch recovered, particularly starch with minimal protein contamination, is extremely important. At higher slurry concentrations, more than 70% starch can be recovered. The selection of the optimum concentration for processing is based on recovery, as well as ease of separation to obtain the purest starch product with minimum starch damage, minimum losses during starch washing, and complete deagglomeration.

Generally, the percent protein in the starch fractions is less in pass 2 starch as compared to pass 1 starch for all treatments (Table 2). Specifically, percent protein is less in pass 2 of the non-waxy rice starch fraction at 32% concentration as compared to the other concentrations (22% and 36%). In the case of waxy rice starch, both 32% and 36% concentrations give similar results. The reason for lower protein levels in these starches is that complete particle size reduction occurs in all (22%, 32%, and 36%) pass 2 waxy rice flour slurries (Table 1). Complete reduction in particle size, ie., complete deagglomeration, ensures clean separations of protein from starch. When incomplete particle size reduction occurs, as exemplified in all pass 1 and in the 36% non-waxy rice flour slurries, then starch-protein agglomerates remain in the starch fraction after centrifugation, thereby increasing the protein concentration of the starch. Despite any number of washings, the protein concentration of the starch fractions will not decrease. Therefore, it is extremely important that complete particle size reduction occurs in order to achieve complete separation from protein and thus a pure starch product. Protein and starch content of the three supernatant fractions was also determined. The percentage of protein in Supernatants #1, #2, and #3 from all concentrations of both starch types ranged from about 2% to about 6%; and ranges for the percentage of solids in Supernatants #1, #2, and #3 were about 4–10%, <1–5%, and all <1%, respectively (data not shown).

Protein solubility of the protein fractions of Table 2 was measured as described above.

Figure 3:
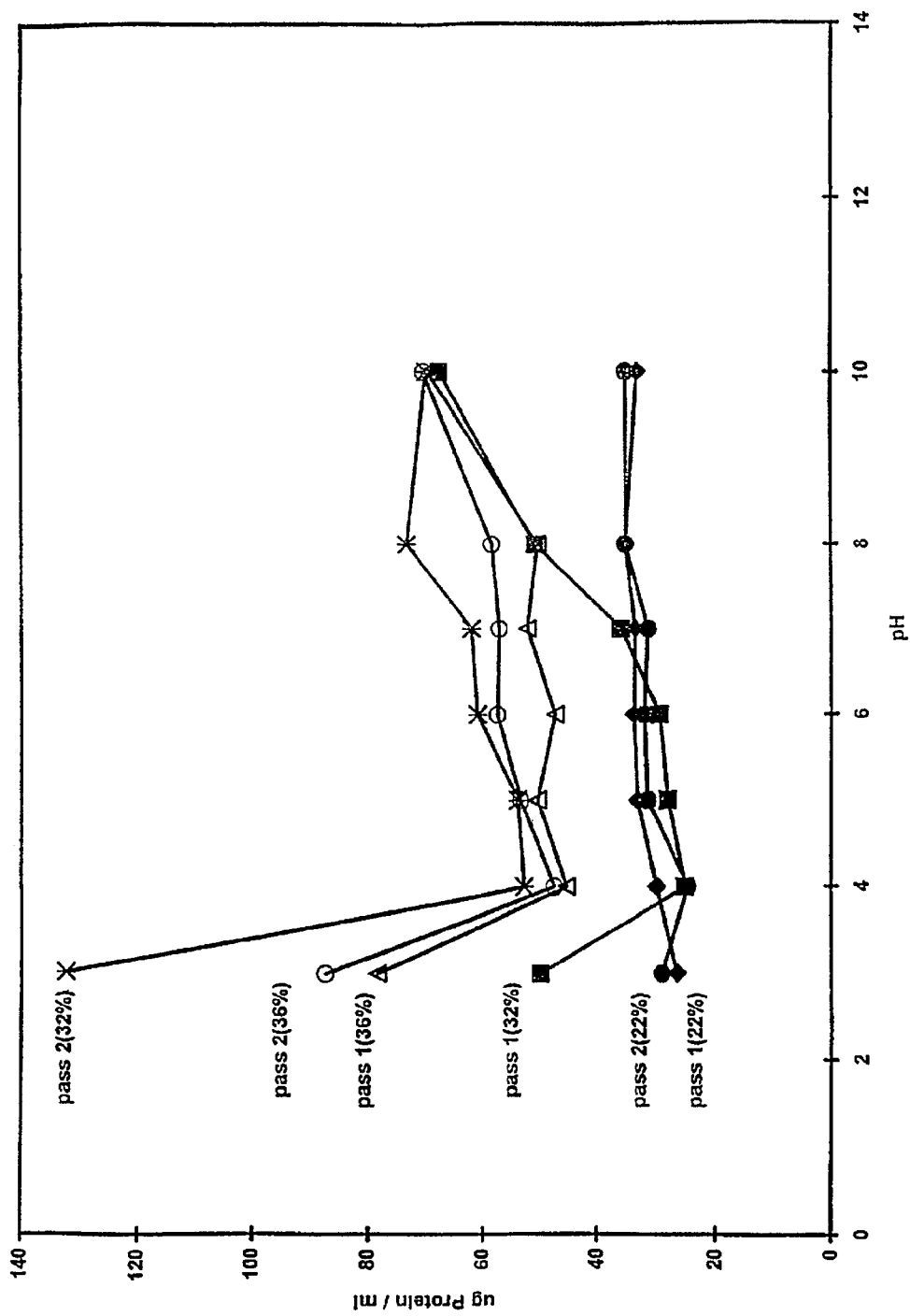
FIG. 3 shows the effect of concentration (22%, 32%, or 36%) and number of passes of non-waxy rice flour slurry through a microfluidizer on the solubility of protein recovered in the protein fraction, i.e., on the amount of protein ($\mu$g/ml) dissolved, as measured over the pH range of pH 3–pH 10. Pooled Standard error of the mean is 7.80.
Figure 4:
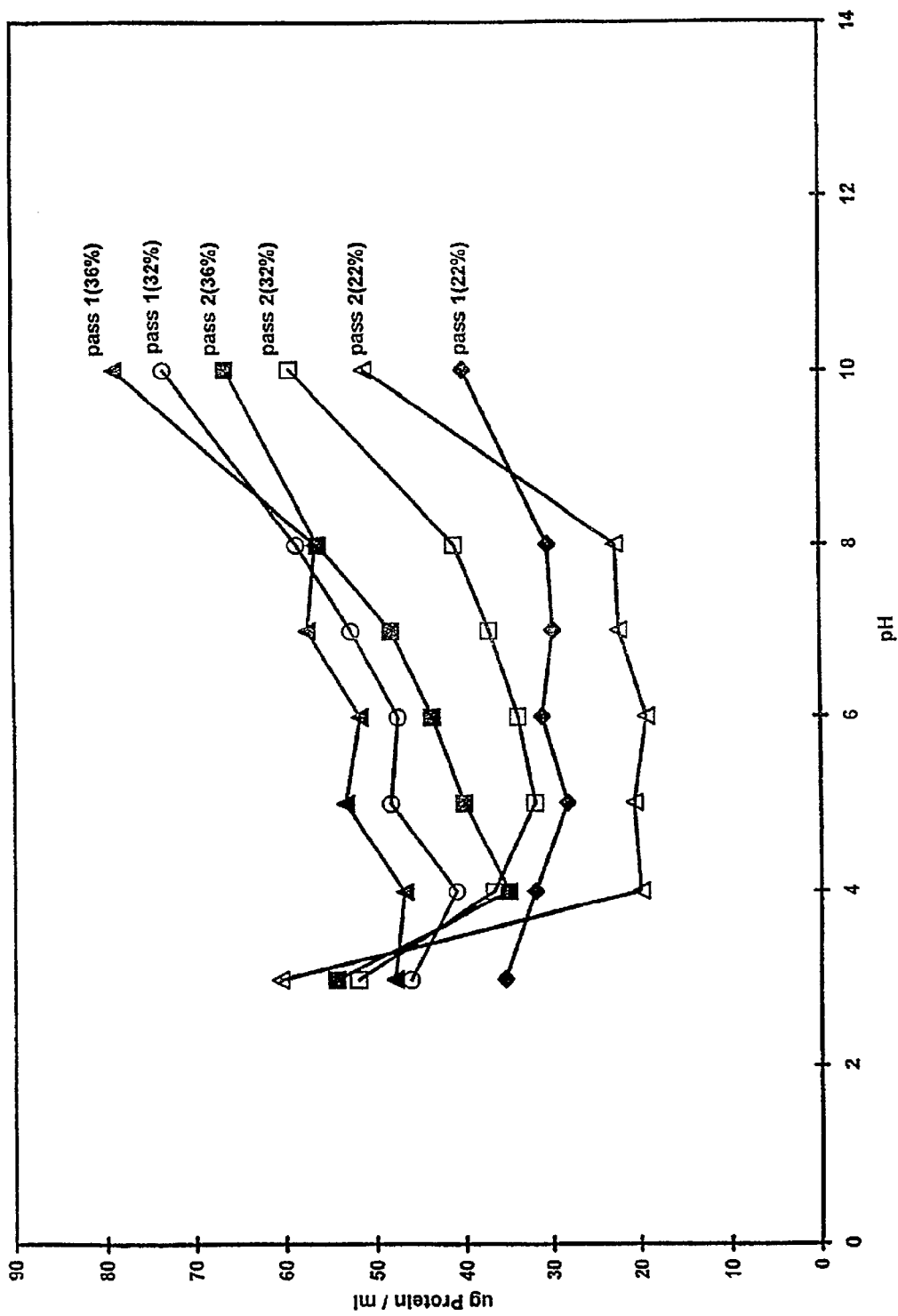
FIG. 4 shows the effect of concentration (22%, 32%, or 36%) and number of passes of non-waxy rice flour slurry through a microfluidizer on the solubility of protein recovered in the protein fraction, i.e., on the amount of protein ($\mu$g/ml) dissolved, as measured over the pH range of pH 3–pH 10. Pooled Standard error of the mean is 5.60.

The solubility of protein from both non-waxy and waxy rice flour increases with increasing concentration (FIG. 3 and FIG. 4). However, the solubility of the protein from waxy flour decreased with increasing number of passes for all concentrations (FIG. 4). Thus, waxy rice flour slurries should be microfluidized at as high a concentration as possible to avoid the loss of solubility associated with lower concentrations of solids and increased passage number. Waxy protein seems sensitive to high shear; this may be due to the lower denaturation temperature of waxy rice protein. The solubility of the protein from non-waxy flour increased with increasing number of passes and concentration of rice flour slurry, with the exception of 22% concentration where there was no change associated with number of passes (FIG. 3). This is probably due to the increase in shear with concentration.

Starch granules were examined by scanning electron microscopy as described above. Starch granules were intact as observed in the electron micrographs. No differences were observed among any treatment group (data not shown).

The pasting properties of starch are important to determine their application in industry. The pasting properties of the isolated starch fractions of Table 2 were determined using AACC Method 61-02. Peak viscosity is related to starch damage and to cooking characteristics. High starch damage results in the rice being easier to cook; lower starch damage and incomplete breakdown of starch-protein agglomerates makes it harder to cook.

The peak viscosity of waxy starch varied with concentration especially from 32% solids to 36% solids (Table 3). The peak viscosity was highest in the 36% solids (pass 2) sample. This is probably due to the fact that the highest starch damage was also observed at this concentration (see Table 1). The peak viscosity was lower at 32% solids in case of non-waxy starch, probably because of lower starch damage (Table 1) and incomplete breakdown of starch-protein agglomerates (81%) which would make it harder to cook. Both waxy and non-waxy pass 2 starches had the lowest breakdown viscosity which is reflective of stability under cooking. As is typical for waxy starches, especially rice waxy starch, waxy starch had very low setback viscosity as compared to non-waxy starch.

TABLE 3

Effect of starch type, concentration, and number of passes of rice flour slurry through the microfluidizer at 14,500 psi on pasting properties of the starch fraction.

| | | Peak (RVU)[a] | | Breakdown (RVU) | | Setback (RVU) | |
|---|---|---|---|---|---|---|---|
| | | Pass 1 | Pass 2 | Pass 1 | Pass 2 | Pass 1 | Pass 2 |
| Waxy | | | | | | | |
| Comm.[b] | | 254.38 ± 1.82 | | 102.56 ± 4.36 | | 21.19 ± 4.74 | |
| 22%[c] | | 249.89 ± 22.7 | 243.83 ± 21.2 | 133.14 ± 4.22 | 125.69 ± 2.95 | 33.86 ± 7.65 | 31.69 ± 4.65 |

TABLE 3-continued

Effect of starch type, concentration, and number of passes of rice flour slurry through the microfluidizer at 14,500 psi on pasting properties of the starch fraction.

| | Peak (RVU)[a] | | Breakdown (RVU) | | Setback (RVU) | |
|---|---|---|---|---|---|---|
| | Pass 1 | Pass 2 | Pass 1 | Pass 2 | Pass 1 | Pass 2 |
| 32% | 236.06 ± 13.9 | 238.78 ± 11.3 | 119.53 ± 4.05 | 118.58 ± 1.98 | 27.47 ± 0.88 | 24.44 ± 1.29 |
| 36% | 284.97 ± 4.57 | 306.36 ± 3.64 | 122.78 ± 3.84 | 154.64 ± 19.6 | 18.86 ± 1.71 | 33.05 ± 16.6 |
| Non-Waxy | | | | | | |
| Comm. | 193.98 ± 1.81 | | 29.15 ± 4.69 | | 54.92 ± 1.76 | |
| 22% | 249.19 ± 19.7 | 265.42 ± 3.84 | 134.53 ± 6.69 | 132.72 ± 9.13 | 112.8 ± 4.56 | 133.7 ± 7.06 |
| 32% | 217.89 ± 28.5 | 223.44 ± 32.4 | 86.33 ± 4.99 | 83.22 ± 2.99 | 121.0 ± 19.1 | 118.3 ± 12.2 |
| 36% | 238.59 ± 8.43 | 251.92 ± 13.1 | 87.79 ± 1.10 | 91.11 ± 8.86 | 124.6 ± 6.36 | 121.9 ± 5.07 |

[a]All data in Rapid Visco Units
[b]Commercially available starch
[c]Concentration of solids On comparing the results of paste viscosity with commercially available starches, the non-waxy rice produced with the microfluidizer had high breakdown viscosity and setback. This may be related to the particular rice variety selected. Appropriate varieties will have to be selected for optimum pasting properties.

Waxy rice starch is a unique starch known for its superior freeze-thaw capability as compared to other non-waxy and waxy starches. As has been shown previously, an aqueous 5% paste of waxy rice starch showed no syneresis until after 20 freeze-thaw cycles, while waxy corn and sorghum starches were stable for only 3 freeze-thaw cycles (Schoch, T. J. 1967. In Starch: Chemistry and Technology, supra). As is typical, the pasting temperature for waxy starches was lower as compared to non-waxy starches (Table 4).

TABLE 4

Effect of starch type, concentration, and number of passes of rice flour slurry through the microfluidizer at 14,500 psi on pasting temperature of the starch fraction.

| | | Pasting Temperature | |
|---|---|---|---|
| Starch | Conc* | Pass 1 | Pass 2 |
| Waxy | | | |
| | Commercial | 66.89 ± 0.25 | |
| | 22% | 67.53 ± 0.08 | 67.62 ± 0.26 |
| | 32% | 67.90 ± 0.48 | 67.90 ± 0.05 |
| | 36% | 67.78 ± 0.16 | 67.73 ± 0.14 |
| Non-Waxy | | | |
| | Commercial | 81.14 ± 0.39 | |
| | 22% | 79.85 ± 0.22 | 80.12 ± 0.46 |
| | 32% | 82.37 ± 0.33 | 81.33 ± 0.78 |
| | 36% | 82.19 ± 0.48 | 81.47 ± 0.65 |

*Concentration of solids

Overall, no differences were found in pasting temperatures of microfluidized waxy starch and commercially available starch.

After evaluating all of the above data wherein the pressure of the microfluidizer run was 14,500 psi, it was determined that the 32% rice flour concentration and two passes through the microfluidizer produces (1) the best starch with the lowest starch damage, (2) complete particle size reduction, and (3) better pasting characteristics. Under these conditions, over 70% of the starch could be recovered with the least amount of contaminating protein present. Further, the protein in the protein fraction showed increased solubility.

Example 3

A 120 mesh rice flour was selected as the starting material in order to maintain a consistent flow stream entering the microfluidizer. Waxy and non-waxy flour slurries at a concentration of 32% (wgt/vol) in water were passed twice at 9000 psi through a Microfluidizer® equipped with two chambers: F20Y and H230Z. Samples were collected from each pass for further analysis. After microfluidization, the rice slurry was passed through ice-cooled cooling coils to remove any heat added during microfluidization.

The effect of using a microfluidizer pressure of 9000 psi on various starch and protein properties was analyzed. Results are shown in Table 5.

TABLE 5

Effect of processing 32% (d.b.) waxy and non-waxy rice flour slurry through the microfluidizer at 9000 psi on various starch properties.

| | | Waxy | | Non-Waxy | |
|---|---|---|---|---|---|
| Property | % | Pass 1 | Pass 2 | Pass 1 | Pass 2 |
| Starch Damage | | 5.96 ± 0.95 | 6.13 ± 0.14 | 5.88 ± 1.23 | 5.99 ± 0.81 |
| % Particle Size (<10 microns) | | 94.26 ± 4.48 | 99.18 ± 0.68 | 88.67 ± 1.52 | 91.67 ± 9.49 |

TABLE 5-continued

Effect of processing 32% (d.b.) waxy and non-waxy rice flour slurry through the microfluidizer at 9000 psi on various starch properties.

| Property | % | Waxy | | Non-Waxy | |
|---|---|---|---|---|---|
| | | Pass 1 | Pass 2 | Pass 1 | Pass 2 |
| Protein Fraction | Protein: | 32.83 ± 1.36 | 41.19 ± 0.46 | 28.65 ± 3.26 | 39.45 ± 1.90 |
| | Solid: | 12.28 | 12.24 | 15.5 | 16.69 |
| Starch Fraction | Protein: | 4.42 ± 0.33 | 3.33 ± 0.51 | 5.34 ± 0.95 | 4.60 ± 1.12 |
| | Solid: | 76.94 | 76.21 | 79.59 | 77.14 |
| Supernatant #1 | Protein: | 2.93 ± 0.13 | 2.42 ± 0.39 | 3.87 ± 0.20 | 3.23 ± 0.25 |
| | Solid: | 8.44 | 8.75 | 3.85 | 4.69 |
| Supernatant #2 | Protein: | 3.44 ± 0.14 | 2.88 ± 0.07 | 5.57 ± 0.28 | 4.53 ± 0.21 |
| | Solid: | 1.99 | 2.3 | 0.92 | 1.2 |
| Supernatant #3 | Protein: | 5.42 ± 1.01 | 4.35 ± 0.16 | 7.57 ± 0.27 | 6.45 ± 0.88 |
| | Solid: | 0.35 | 0.5 | 0.14 | 0.29 |
| Rapid Visco Analysis* | | | | | |
| Peak | | 237.78 ± 5.63 | 278.33 ± 54.13 | 225.83 ± 12.23 | 251.39 ± 39.57 |
| Minimum | | 115.17 ± 5.54 | 168.86 ± 66.13 | 140.50 ± 11.66 | 173.00 ± 52.43 |
| Breakdown | | 122.61 ± 0.79 | 109.47 ± 12.10 | 85.33 ± 4.92 | 78.39 ± 13.66 |
| Final | | 145.09 ± 5.75 | 191.22 ± 70.25 | 262.86 ± 8.94 | 284.25 ± 37.34 |
| Setback | | 29.92 ± 0.84 | 22.36 ± 4.44 | 122.36 ± 9.50 | 111.25 ± 16.53 |
| Pasting Temperature | | 68.23 ± 0.29 | 68.68 ± 0.08 | 81.77 ± 0.63 | 75.43 ± 10.70 |

*All data in Rapid Visco Units

Figure 5:
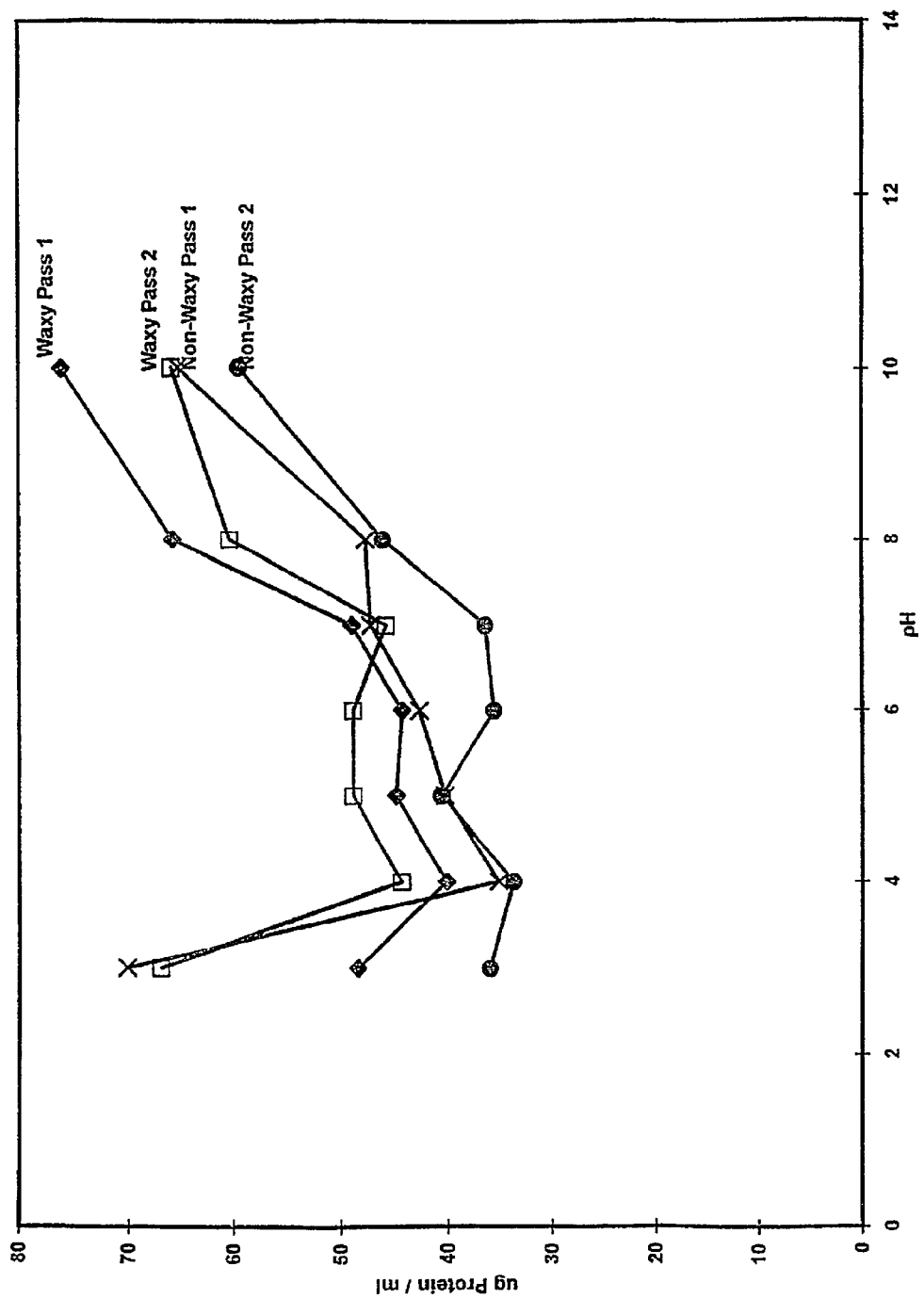
FIG. 5 shows the effect of rice type (waxy and non-waxy), concentration, and number of passes of the rice flour slurry through a microfluidizer on the solubility of the protein recovered in the protein fraction, i.e., on the amount of protein ($\mu$g/ml) dissolved, as measured over the pH range of pH 3–pH 10. Pooled Standard error of the mean is 4.89.

There was improvement in recovery of starch at the lower pressure of 9000 psi; however, the purity decreased as compared to passes at the higher pressure of 14,500 psi (Table 1 and Table 2). For waxy flour, complete agglomerate breakdown occurred in two passes. Pasting properties and the amount of starch damage was the same as observed at the higher pressure. However, in the case of non-waxy flour slurries, there was incomplete starch-protein agglomerate breakdown (Table 5) and lower protein solubility (FIG. 5). The pasting characteristics were not typical of pure starch as obtained at higher pressure in two passes at the same concentration (Table 3). This might be due to incomplete breakdown of starch-protein agglomerate and higher protein in the starch. In conclusion, a pressure of 9000 psi is preferred for waxy rice flour slurries, but there is no advantage to processing non-waxy rice flour at 9000 psi.

Example 4

Waxy and non-waxy rice flour slurry at a concentration of 32% (wgt/vol) in water was microfluidized as described in Example 1. Microfluidized slurry was spray dried at inlet temperatures of 200° C. and outlet temperature of 55° C. The spray dried product was pin milled four times until no further de-agglomeration was obtained. Scanning electron microscopy (as described in Example 6), particle size analysis (as described in Example 3), and starch damage analysis was done on the pin-milled microfluidized starch product and compared to the non-microfluidized product.

Figure 6A:
FIGS. 6a–6h show electron micrographs of waxy (FIGS. 6a–6d) and non-waxy (FIGS. 6e–6h) flour at various stages of processing to produce protein-coated starch granules.
Figure 6B:
Figure 6C:
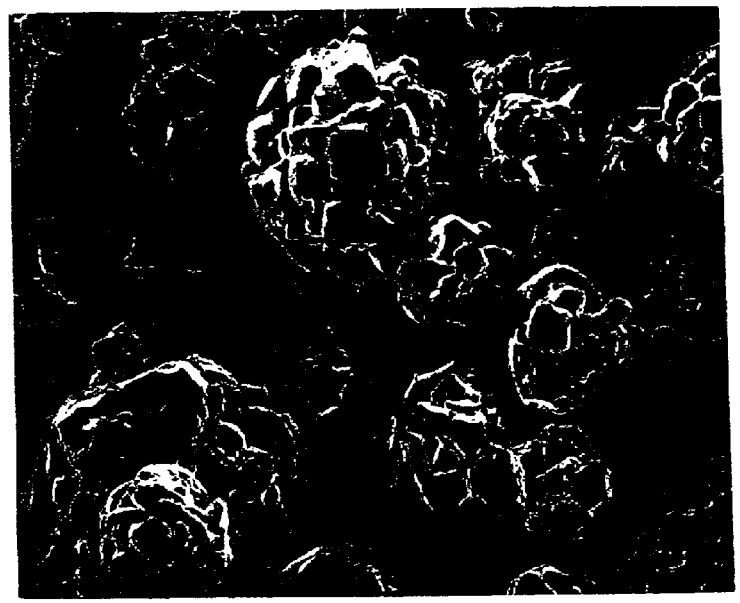
Figure 6D:
Figure 6E:
Figure 6F:
Figure 6G:
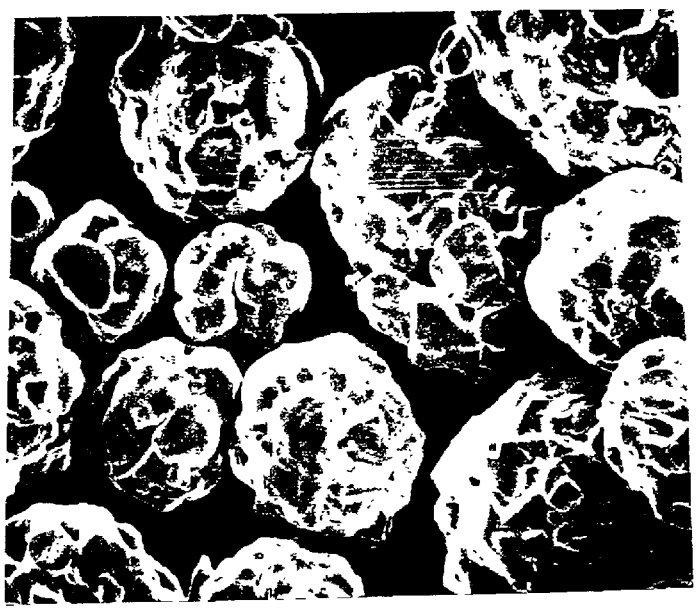
Figure 6H:
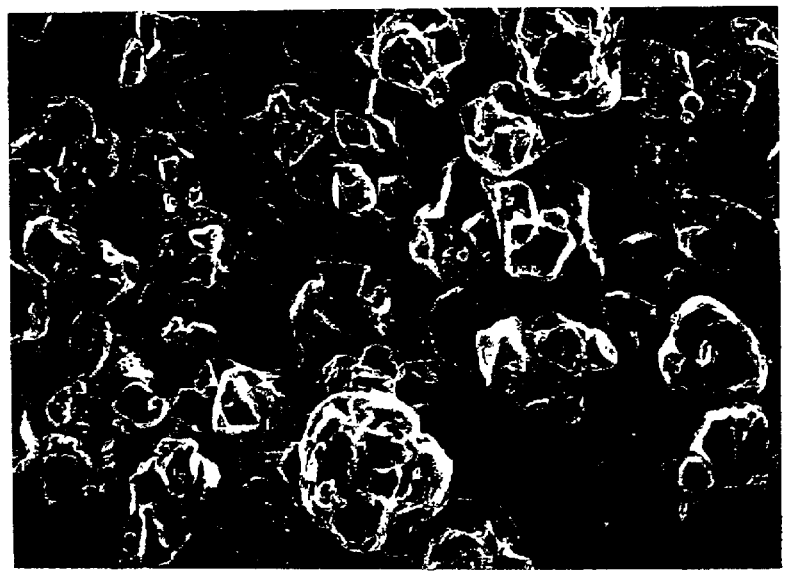

FIGS. 6a and 6e are scanning electron micrographs of 120 mesh waxy and non-waxy flour, respectively. The scanning electron micrographs show that the microfluidizer completely deagglomerates the 120 mesh waxy and non-waxy flour and produces individual starch granules (FIGS. 6b and 6f). On spray-drying the microfluidized product, the protein dries on the starch and coats the starch granules; reagglomeration takes place (FIGS. 6c and 6g). The reagglomerated coated granules are further deagglomerated utilizing four passes through a pin mill to produce essentially deagglomerated starch particles coated with protein (FIGS. 6d and 6h).

Figure 7A:
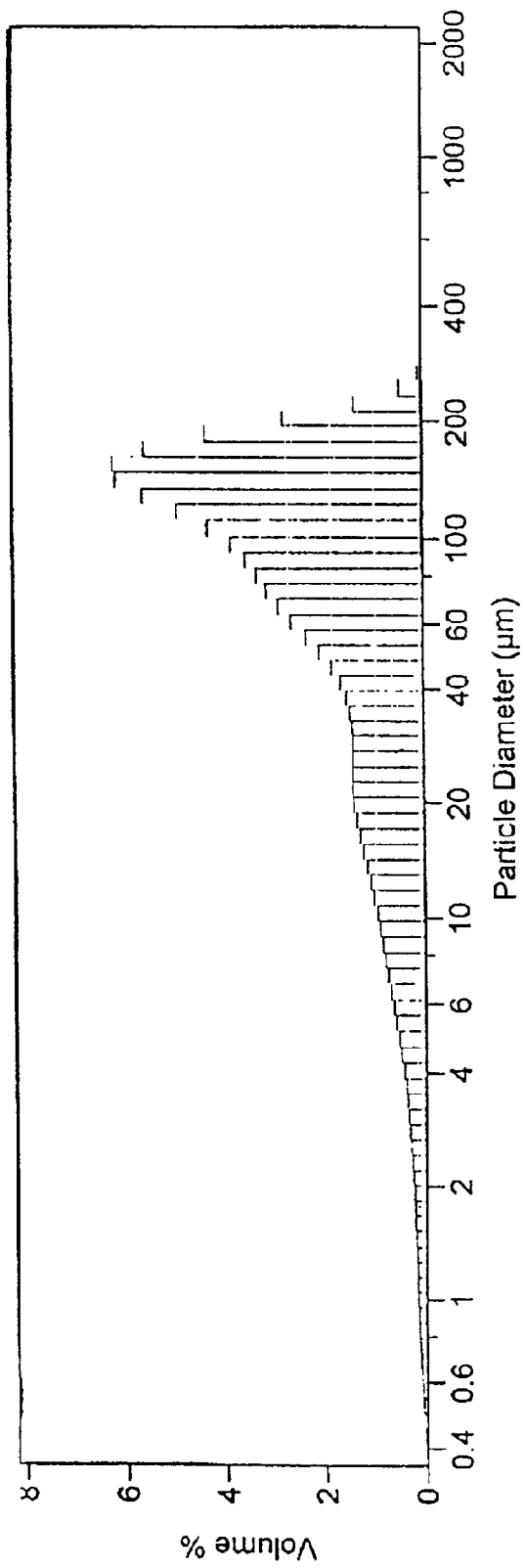
FIGS. 7a–7d show the particle size analysis of non-waxy flour at various stages of processing to produce protein-coated starch granules.
Figure 7B:
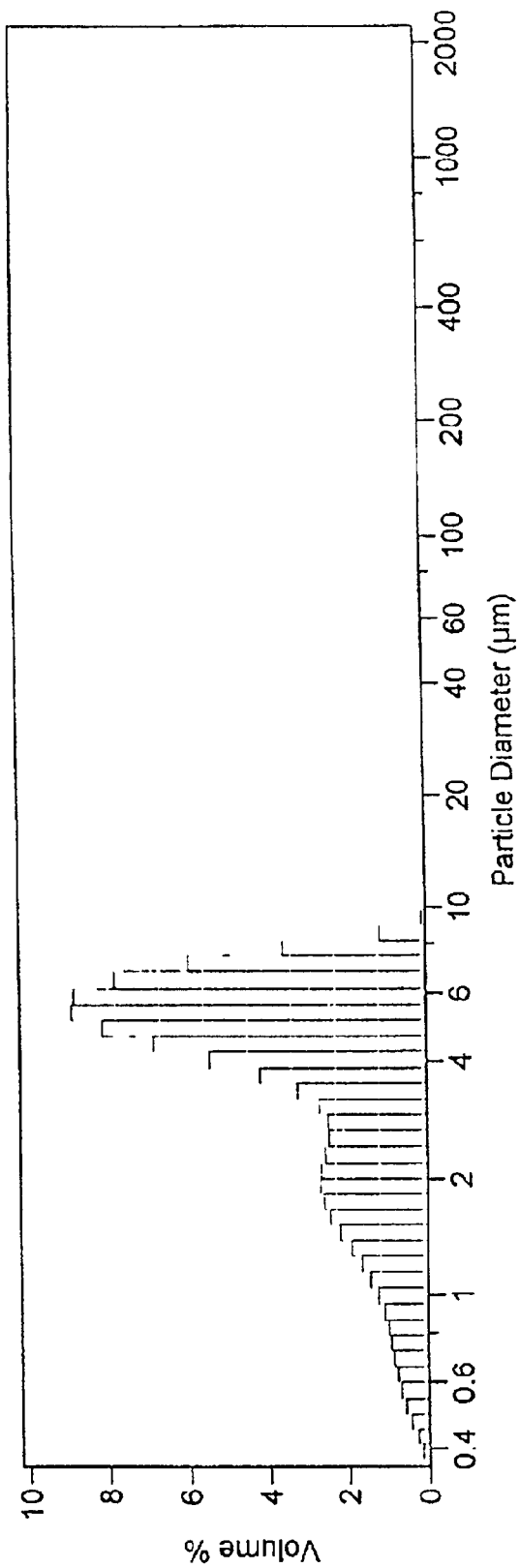
Figure 7C:
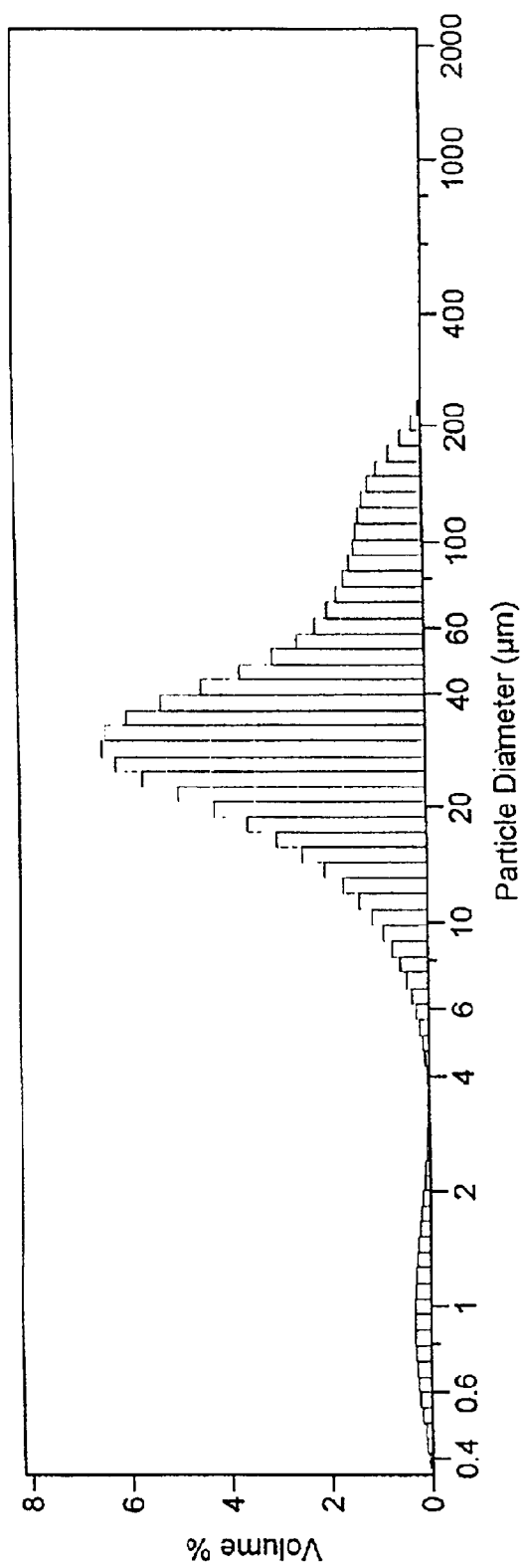
Figure 7D:
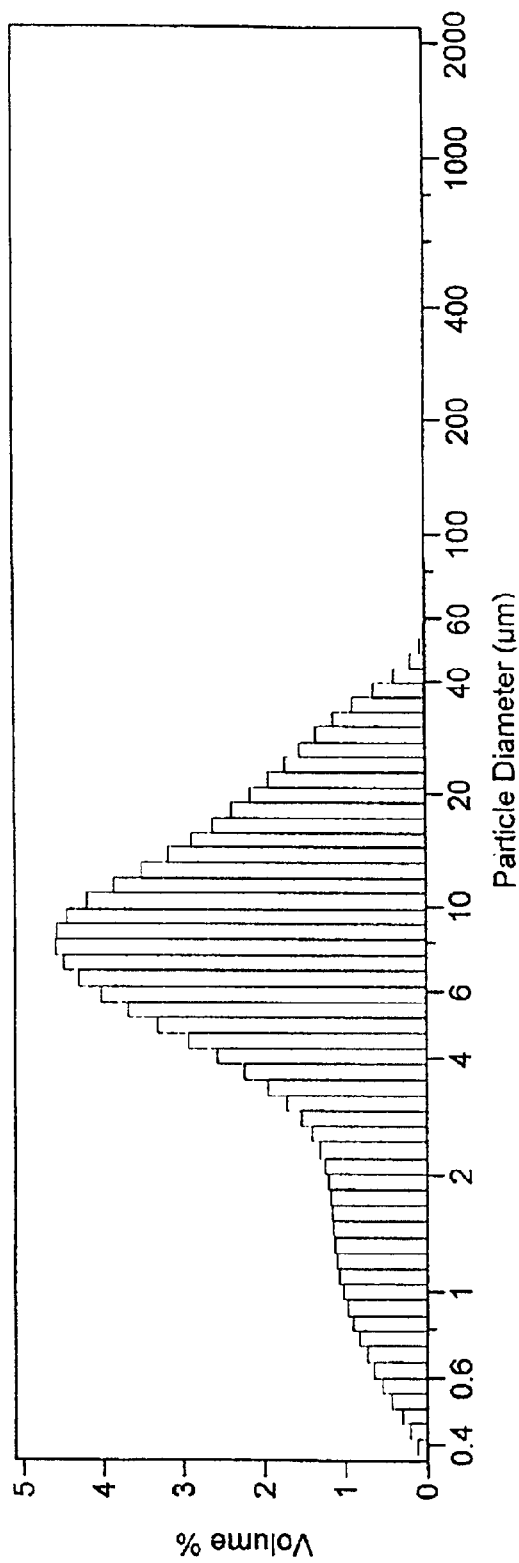
Figure 8A:
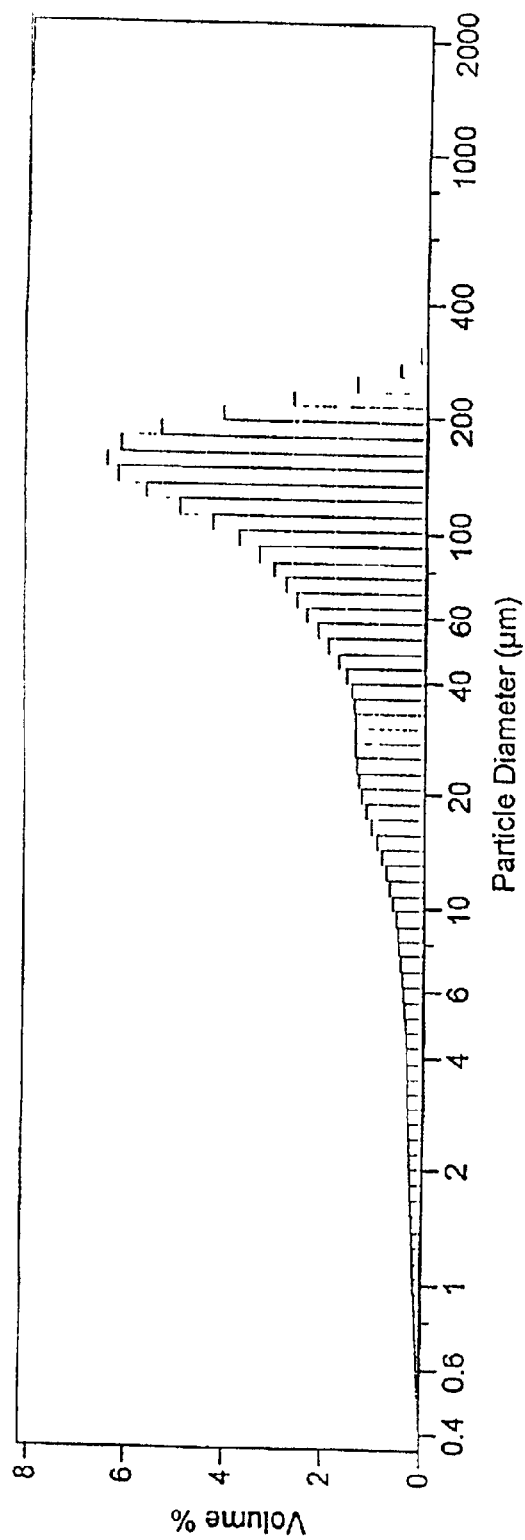
FIGS. 8a–8d show the particle size analysis of waxy flour at various stages of processing to produce protein-coated starch granules.
Figure 8B:
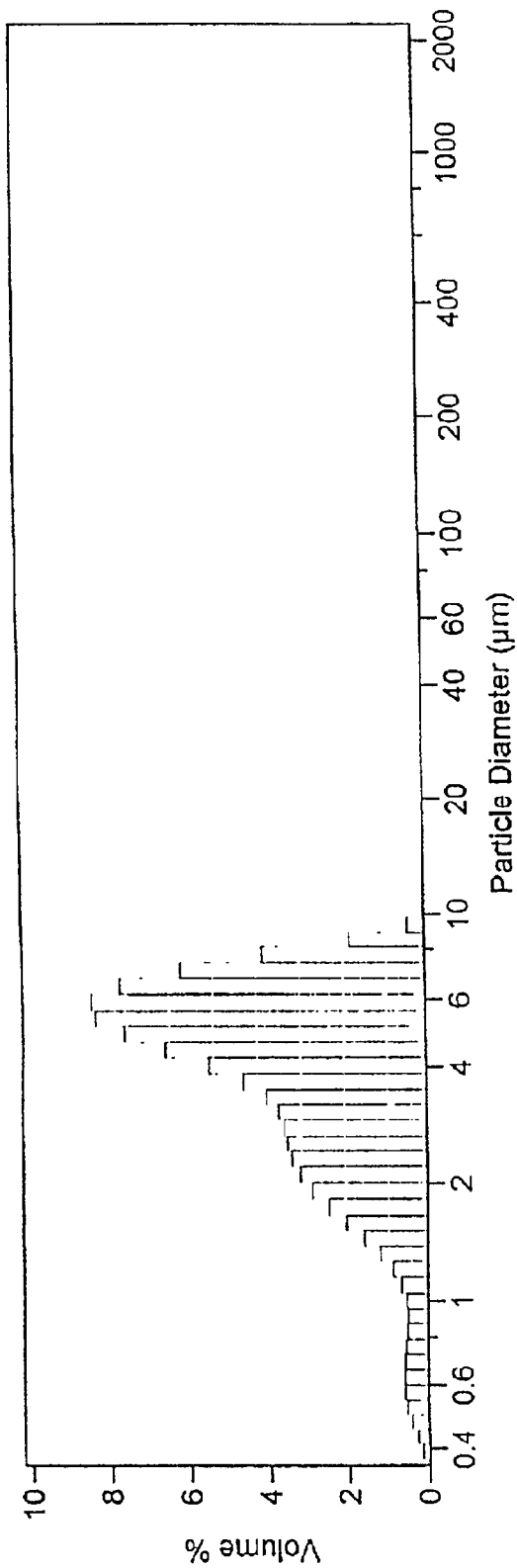
Figure 8C:
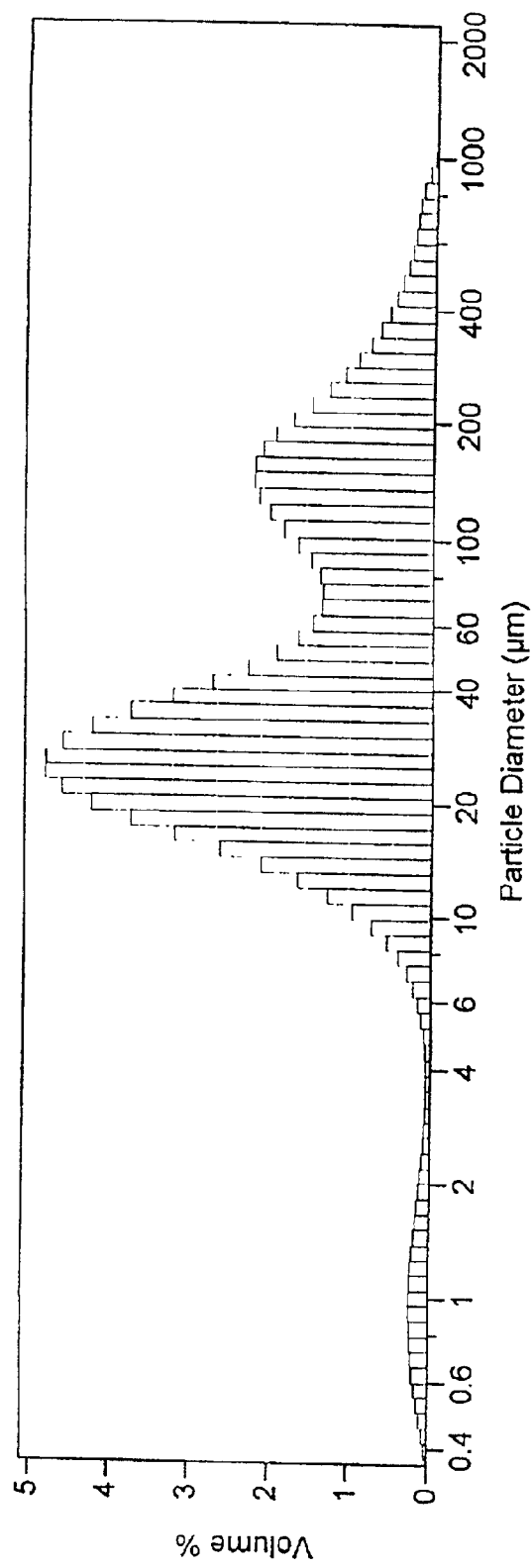
Figure 8D:
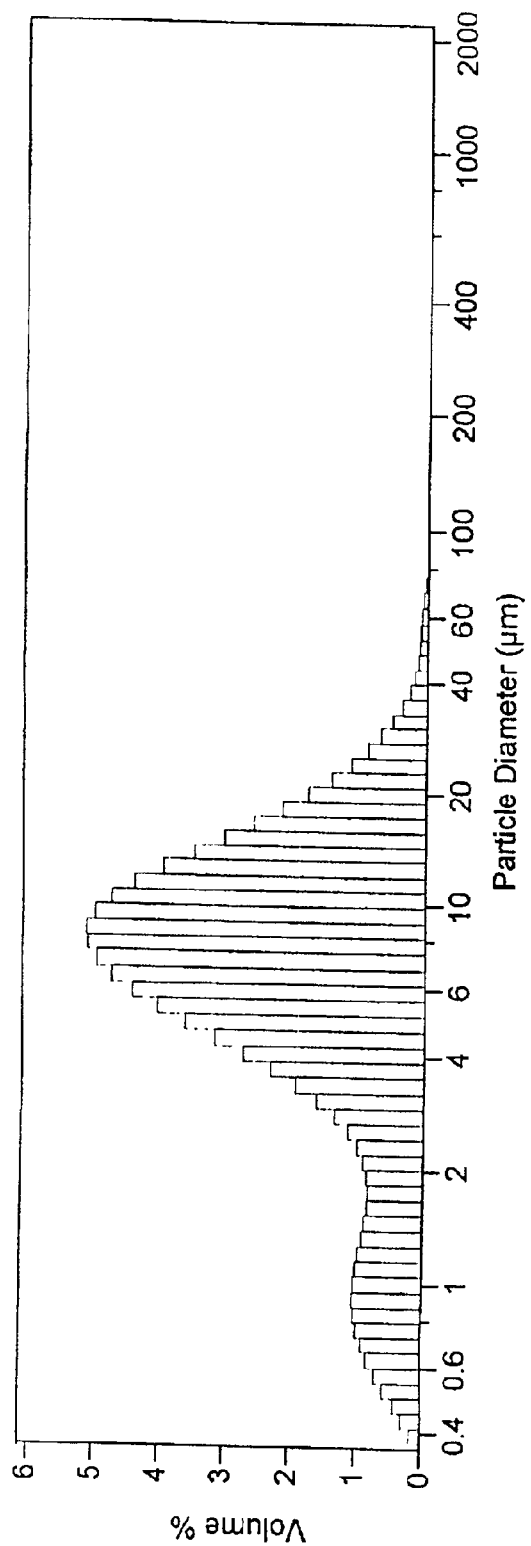

As shown in the particle size analysis of FIGS. 7a–7d for non-waxy flour and FIGS. 8a–8d for waxy flour, starch is completely deagglomerated on microfluidizing (FIGS. 7b and 8b). The particle size increases on spray-drying due to reagglomeration (FIGS. 7c and 8c). On pin-milling, particle size of the protein-coated starch granules is reduced (FIGS. 7d and 8d).

Starch damages were measured utilizing AACC Method 76-30A where digestion with alpha-amylase is measured (Table 6).

TABLE 6

Percent Starch Damage Resulting from Spray-Drying and Milling Procedures.

| | % Starch Damage |
|---|---|
| Non-waxy 120 mesh flour | |
| Start | 15.56% |
| Microfluidized, spray-dried | 16.99% |
| Microfluidized, spray-dried, pin-milled 4X | 20.96% |
| Waxy 120 mesh flour | |
| Start | 15.29% |
| Microfluidized, spray-dried | 24.99% |
| Microfluidized, spray-dried, pin-milled 4X | 30.03% |

Starch damage increases as a result of microfluidizing and on further pin-milling. However, only approximately 1% starch damage occurs for every pass through the pin mill. Other mills, such as the impact mill, the hammer mill, the cyclone mill are used for deagglomerating and may produce less damage. In addition, the classifier mill may be used. A single pass in the classifier mill can be equal to four passes in a pin mill. With the classifier mill, the smallest particles are recovered and the remaining larger particles are reprocessed. Furthermore, varying the conditions of drying when utilizing the rotor cell mill/dryer or spray dryer can limit or prevent reagglomeration.

The final deagglomerated protein-coated starch product is essentially comprised of high quality rice starch coated with high quality rice protein. These properties together with its characteristics of a particularly smooth texture and pleasant rice aroma makes it a desirable food product.

Example 5

Figure 9A:
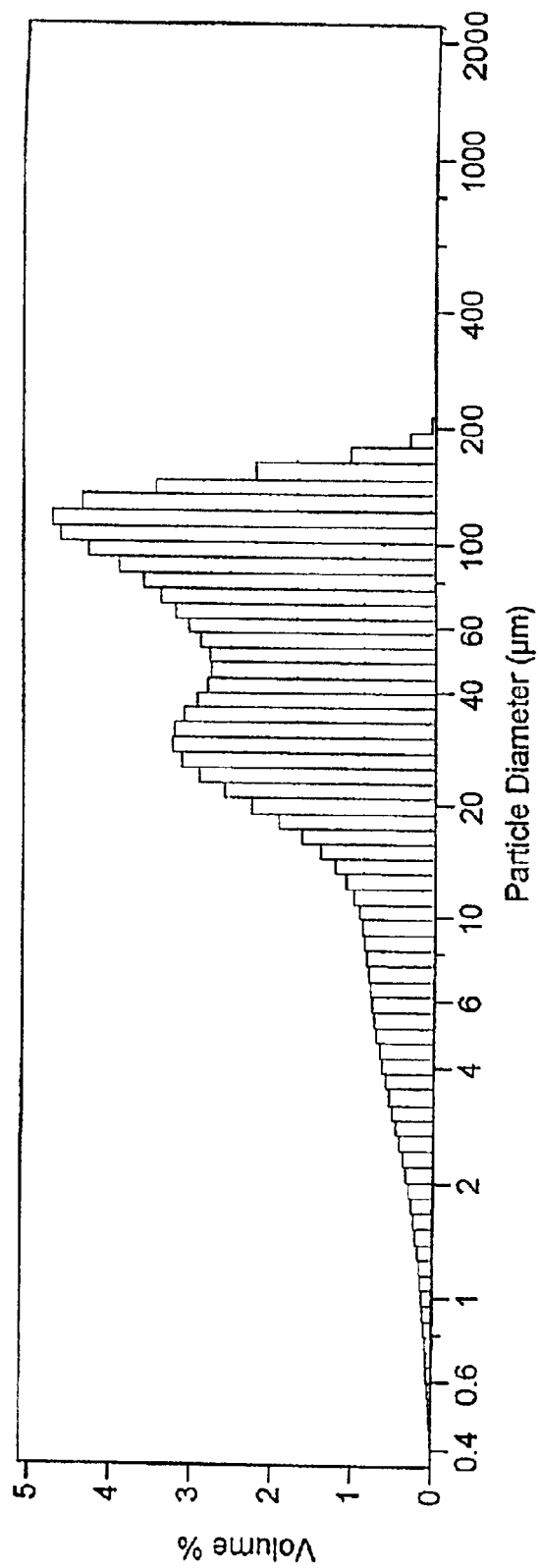
FIGS. 9a and 9b show the particle size analysis of wheat flour after pin milling and of the starch fraction from pass 1 after microfluidization, respectively.

Wheat flour (America's Choice unbleached all purpose), rye flour (Hodgeson's Mill whole grain stone ground) and corn (Pioneer enriched yellow corn meal) were purchased from a local grocery store. Flours were pin-milled to reduce particle size and passed through a 60 mesh screen to obtain a slurry compatible with the microfluidizer. Previous tests with rice flour had shown that optimal results were achieved when rice flour slurry (32% solids) was processed in two passes through a M110Y Microfluidizer® at 12,000 psi utilizing a F20Y/H230Z chamber set. Slurries of screened wheat flour, rye flour, and corn flour were made at concentrations of 32%, 32%, and 25% solids in water (db), respectively, and passed through the Microfluidizer® until complete agglomerate breakdown was obtained. The resulting microfluidized slurry was centrifuged, and particle size analysis was conducted on the starch fraction. The particle size distribution in slurries of wheat flour, rye flour, and corn flour after pin milling (FIGS. 9a, 10a, and 11a, respectively) and after microfluidization (FIGS. 9b, 10b, 11b, respectively) were compared.

Figure 9B:
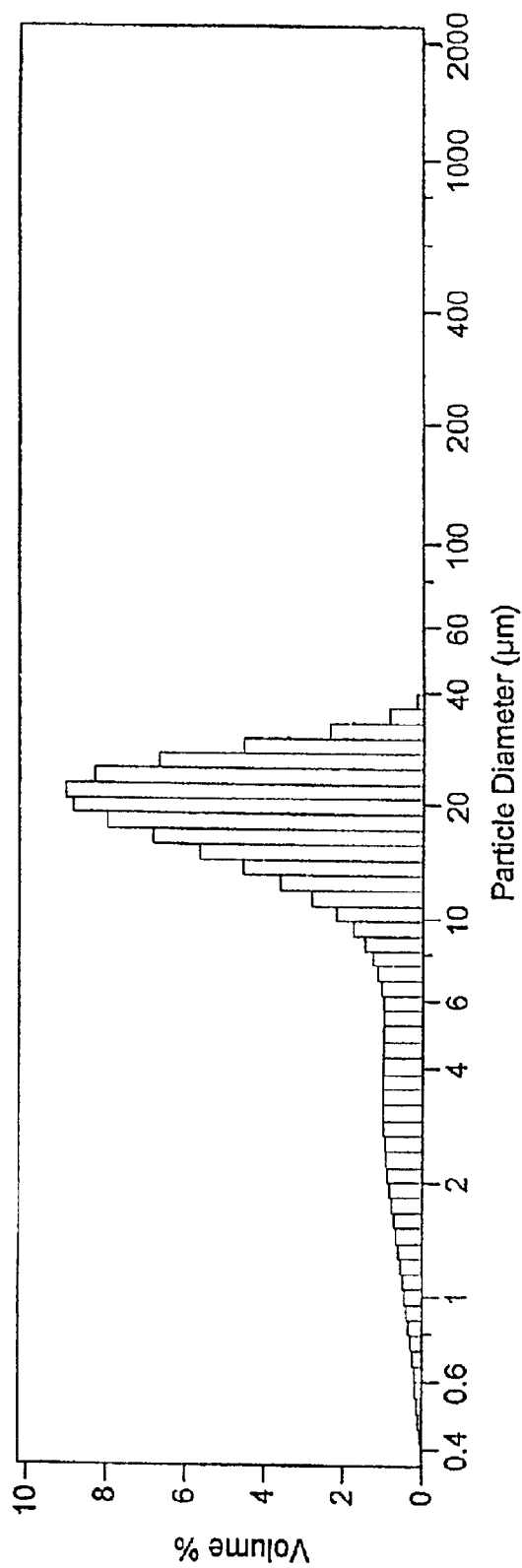
Figure 10A:
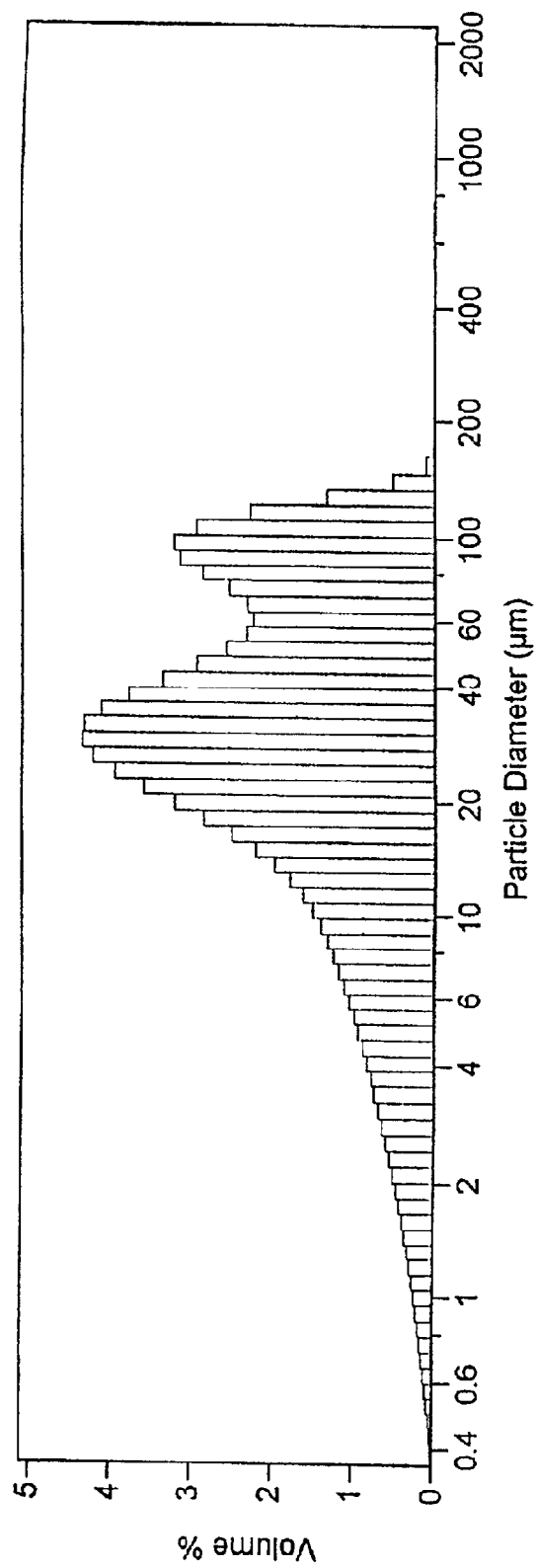
FIGS. 10a and 10b show the particle size analysis of rye flour after pin milling and of the starch fraction from pass 3 after microfluidization, respectively.
Figure 10B:
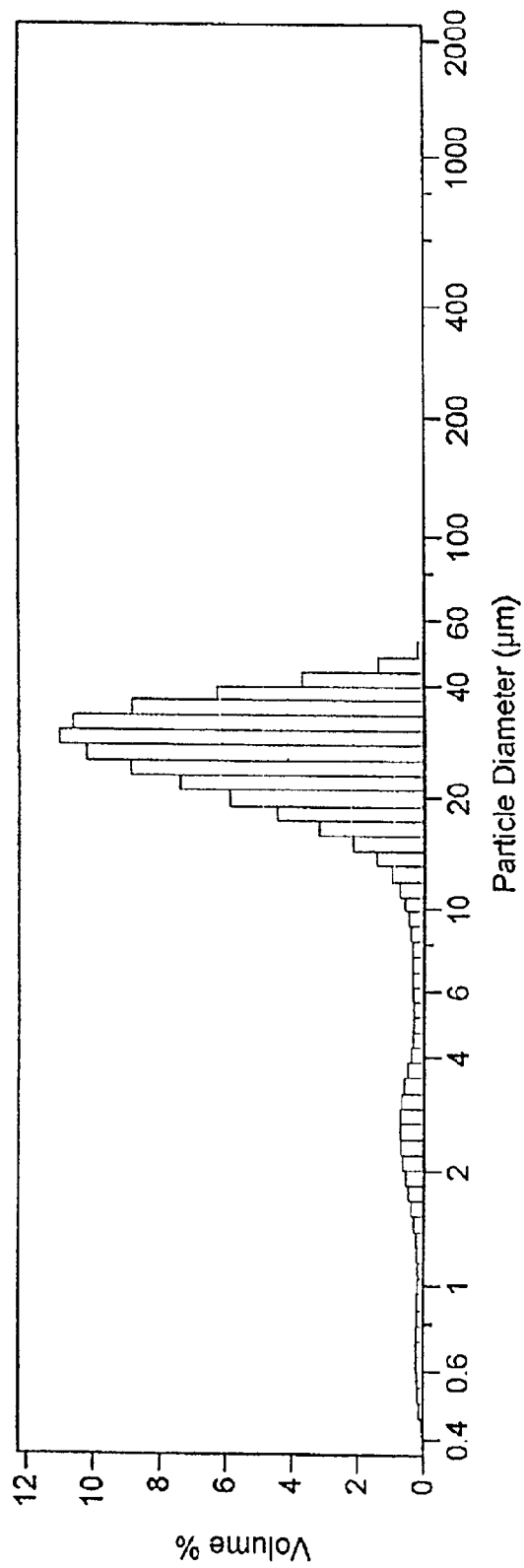
Figure 11A:
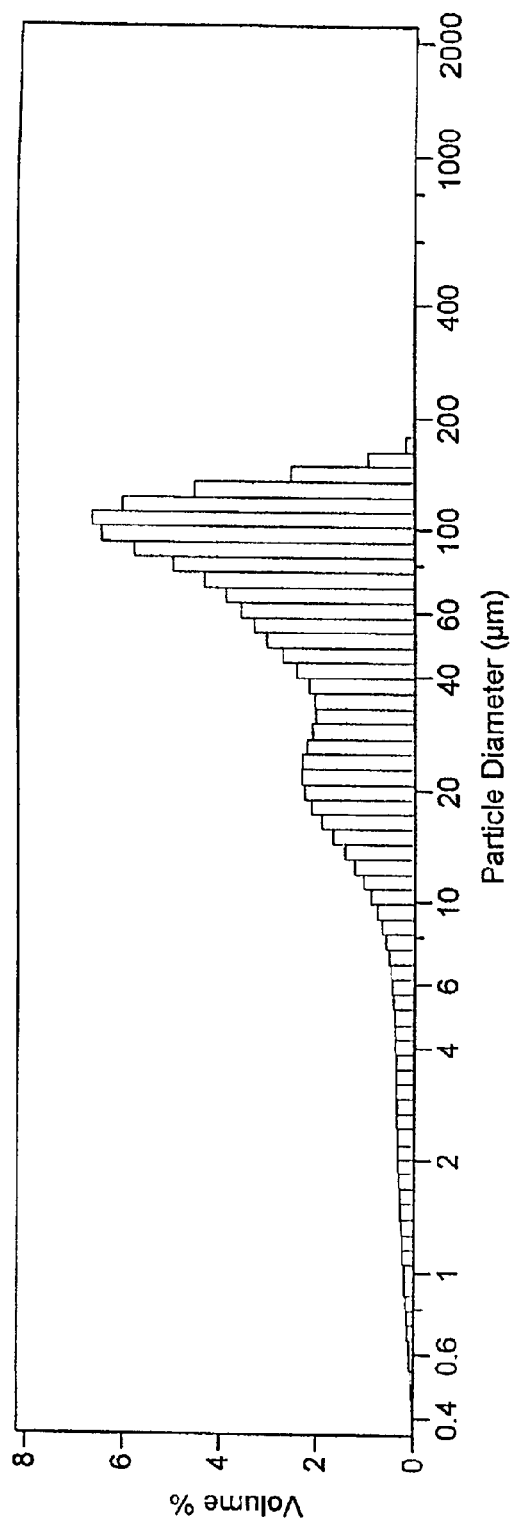
FIGS. 11a and 11b show the particle size analysis of corn flour after pin milling and of the starch fraction from pass 3 after microfluidization, respectively.
Figure 11B:
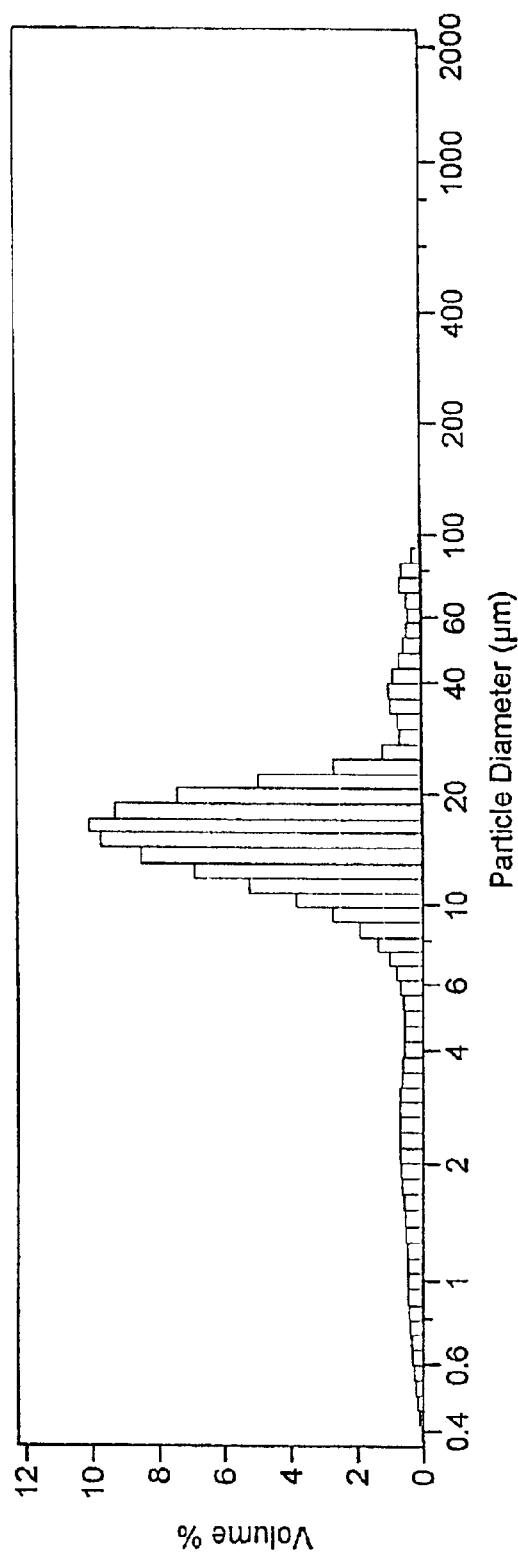

To achieve complete agglomerate breakdown, the different flours required differing processing conditions with respect to initial solid concentration (25% vs. 32%) and number of passes through the Microfluidizer®. Particle diameter was substantially reduced when wheat flour slurry (32% solids) was passed one time through the Microfluidizer® (FIG. 9b). With rye flour slurry at 32% solids, three passes were required to obtain substantially reduced particle size (FIG. 10b). However, when corn flour slurry at 32% solids was processed, even eight passes through the Microfluidizer® were not sufficient for complete deagglomeration. Changing the corn flour slurry to 25% solids resulted in substantial agglomerate breakdown (94%) in three passes (FIG. 11b). Similar incomplete breakdown was seen with 36% solids non-waxy rice flour as shown supra in Table 1. Such incomplete breakdown observed when slurries contain a higher percentage of solids is probably because viscosity of the slurry increases after the first pass thus reducing the velocity of the impacting particles during subsequent passes. There is probably a limiting viscosity beyond which the microfluidization does not occur efficiently. Another possibility is the hardness of the agglomerate could effect the number of passes needed for complete agglomerate breakdown. Further, as is known in the art, the number of passes observed for these flours could be reduced by increasing the pressure or by utilizing different types of chambers.

Example 6

Examples 1–5 reflect laboratory processing. On a larger scale, in a pilot plant study, rice slurry was pumped onto a 60 mesh screen on a Sweco Vibro-energy round separator to obtain rice slurry compatible with the microfluidizer. Screened flour was passed through a Microfluidizer® 210B through a set of three chambers (J20Y/F20Y X 4/H230Z) at a flow rate of approximately 1.9 liter per min. at 15,000 psi for non-waxy flour and 10,000 psi for waxy flour and medium grain flour. Microfluidized flour was then stored in 18.93 liter buckets until sufficient material was collected for separation into rice starch and protein. Microfluidized rice slurry was diluted to an optimum concentration (less than 25% solids), equilibrated to at least 80° F., and centrifuged utilizing a nozzle disc centrifuge. Underflow and overflow samples (15 ml) were centrifuged in a clinical centrifuge at 1500×G; the volume of starch or protein in the underflow or overflow samples dictated the centrifuging conditions. As a result of adjusting the flow rate, the overflow from the first centrifugation was primarily protein; underflow obtained from the second centrifugation was primarily starch. Lower flow rate results in a cleaner protein product; higher flow rate results in some starch with the protein in the overflow. The underflow (Underflow 1) was primarily starch and was re-centrifuged (Underflow 2) to separate more protein. Overflow 1 and 2 were combined to obtain total protein. Samples of feed, underflow and overflow from both centrifugations were frozen and freeze dried. Hydrogen peroxide was added to a final concentration of 3.75% (v/v) to stabilize the flour slurry.

Figure 12A:
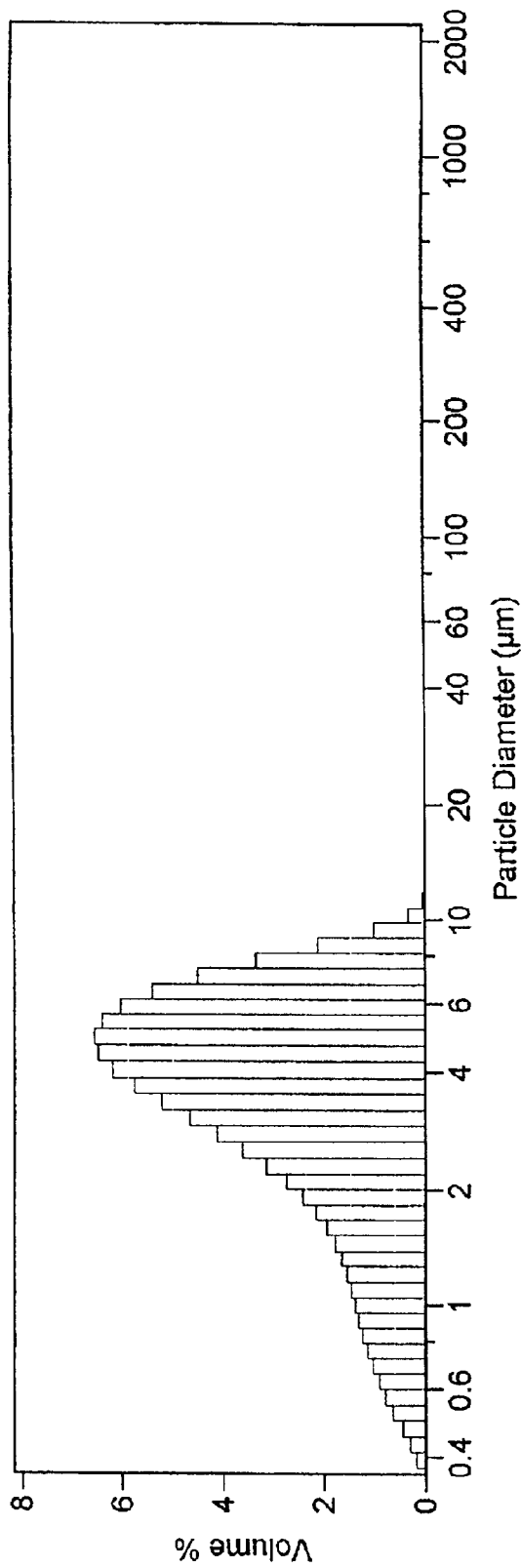
FIGS. 12a, 12b, and 12c show the particle size analysis of long (FIG. 12a), medium (FIG. 12b), and short (FIG. 12c) grain rice flours microfluidized under pilot plant conditions.
Figure 12B:
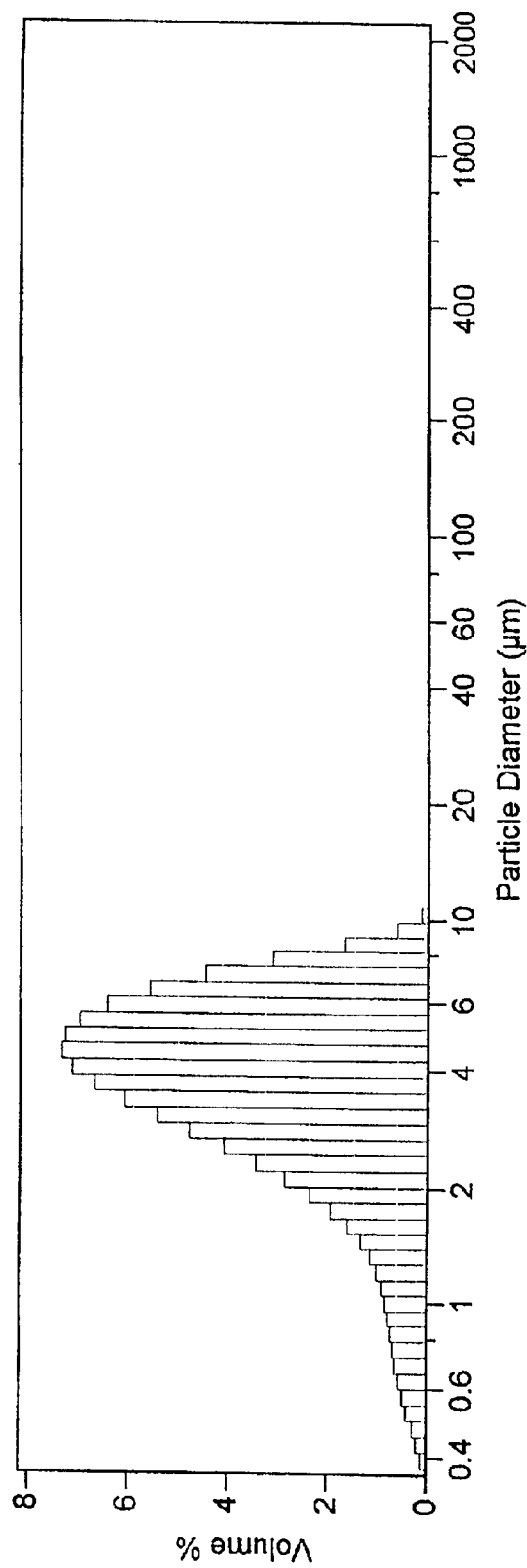
Figure 12C:
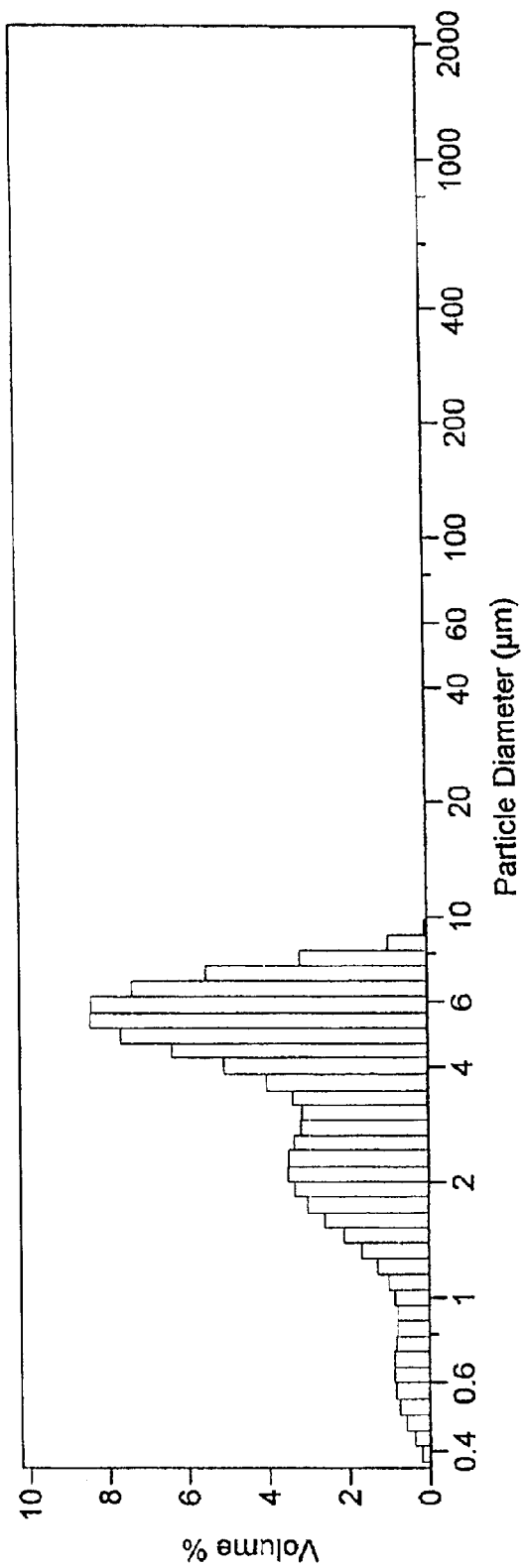

When J20Y/F20Y X 4/H230Z chambers were used during scale up, complete particle size reduction was obtained. FIGS. 12a, 12b, and 12c show the particle size analysis of microfluidized long, medium, and short grain flour. Processing an initial product of 500 microns or less resulted in complete deagglomeration of starch and protein; all particles were 10 microns or below. The protein and starch analysis of the three types of rice grains obtained during centrifugation is outlined in Table 7. Passing the rice flour slurry through the centrifuge twice reduced the amount of protein in the starch fractions of all grains by at least 50%. Starch damage was high in all flours (Feed 1); however, washing and centrifugation removed damaged starch (Underflow 2). These results are comparable to those found with commercial products; commercial waxy and non-waxy starches had 7.93% and 8.20% starch damage, respectively. However, it is expected that processing the microfluidized slurry on a commercial scale, i.e., utilizing liquid cyclones for further washing/purification to remove protein and other impurities, will result in a starch product with even lower percentages of protein and damaged starch.

TABLE 7

Protein and Starch Analysis of Various Fractions from the Centrifugal Separation of Microfluidized Rice Flour Slurries.

| Sample | % Protein | % Starch Damage |
| --- | --- | --- |
| Long Grain (Non-waxy) | | |
| Feed 1 | 8.61 ± 0.24 | 9.23 ± 0.69 |
| Overflow 1 | 32.62 ± 0.18 | |
| Underflow 1 | 6.75 ± 0.09 | |
| Feed 2 | 9.21 ± 0.04 | |
| Overflow 2 | 29.53 ± 6.45 | |
| Underflow 2 | 5.68 ± 0.07 | 6.42 ± 0.49 |
| Medium Grain (Non-waxy) | | |
| Feed 1 | 8.49 ± 0.04 | 13.35 ± 0.80 |
| Overflow 1 | 34.16 ± 1.06 | |
| Underflow 1 | 4.79 ± 0.15 | |
| Feed 2 | 7.70 ± 0.10 | |
| Overflow 2 | 18.03 ± 0.12 | |
| Underflow 2 | 4.26 ± 0.20 | 8.10 ± 0.24 |
| Short Grain (Waxy) | | |
| Feed 1 | 8.47 ± 0.78 | 15.81 ± 1.35 |
| Overflow 1 | 32.88 ± 2.03 | |
| Underflow 1 | 5.43 ± 0.14 | |
| Feed 2 | 7.48 ± 1.46 | |
| Overflow 2 | 14.12 ± 0.33 | |
| Underflow 2 | 3.93 ± 0.17 | 8.10 ± 0.24 |

TABLE 8

Rapid Visco Analysis of Starch (Underflow 2).

|  | Long Grain | Medium Grain | Short Grain |
| --- | --- | --- | --- |
| Peak | 189.42 ± 2.14 | 232.36 ± 5.78 | 279.45 ± 4.39 |
| Trough | 123.81 ± 1.03 | 139.50 ± 3.50 | 147.89 ± 4.10 |
| Breakdown | 65.61 ± 1.14 | 92.86 ± 3.56 | 131.55 ± 1.04 |
| Final Viscosity | 244.14 ± 1.01 | 225.78 ± 5.52 | 171.81 ± 2.83 |
| Setback Viscosity | 120.33 ± 0.80 | 86.28 ± 2.27 | 23.92 ± 2.47 |
| Peak Time | 6.21 ± 0.04 | 6.28 ± 0.02 | 3.77 ± 0.02 |
| Pasting Temperature | 82.62 ± 0.45 | 81.27 ± 3.36 | 67.40 ± 0.25 |

As was discussed supra, there are applications where it would be beneficial to have the protein present with the starch. Thus, after deagglomeration of rice flour through microfluidization, individual rice granules can be dried together with varying amounts of protein to form a superfine flour of starch coated with protein. Therefore, microfluidized slurries and the starch and protein products resulting from centrifugation of the microfluidized slurries were subjected to spray drying. Seven different types of materials representing a total of about 9000 lbs were spray dried: microfluidized slurries of (1) non-waxy long grain rice, (2) non-waxy medium grain rice, (3) waxy short grain rice, the starch products from centrifugation of each of these three microfluidized slurries (4–6), and a sample (7) comprising protein pooled from the protein products resulting from centrifugation of the long, medium, and short grain microfluidized samples. The inlet temperature of 400° F. and outlet of 200° F. were suitable for spray drying waxy and non-waxy microfluidized flour including high protein starches. The end moisture content of starch/flour was 5%.

All publications and patents mentioned in this specification are herein incorporated by reference to the same extent as if each individual publication or patent was specifically and individually indicated to be incorporated by reference.

It is understood that the foregoing detailed description is given merely by way of illustration and that modifications and variations may be made therein without departing from the spirit and scope of the invention.

I claim:

1. A method for processing an amylaceous flour, said method comprising:
   a. providing an aqueous slurry of an amylaceous flour comprising starch-protein and starch-starch agglomerates;
   b. subjecting said slurry to conditions of shear, cavitation and impact; and
   c. obtaining a product comprising minimal starch damage and the homogeneous dispersion of individual starch granules and protein in a liquid matrix.

2. The method of claim 1, wherein said conditions of shear, cavitation and impact are imparted by microfluidization.

3. The method of claim 1, wherein said impact is imparted by converging two streams of said slurry.

4. The method of claim 1, wherein said impact is imparted by particle—particle collision.

5. The method of claim 1, wherein step (b) is conducted under high pressure.

6. The method of claim 5, wherein said high pressure is in the range of about 3000–30,000 psi.

7. The method of claim 5 wherein said high pressure is in the range of about 9000–15,000 psi.

8. The method of claim 1, wherein said amylaceous flour is milled seed selected from the group consisting of cereals, beans and legumes.

9. The method of claim 1, wherein said amylaceous flour is milled seed selected from the group consisting of rice, corn, oats, wheat, rye, soybeans, and peas.

10. The method of claim 1, wherein said amylaceous flour is milled rice.

11. The method of claim 1, and further comprising the step of separating said deagglomerated starch granules from said protein.

12. The method of claim 1, and further comprising recovering said starch granules and said protein from said slurry.

13. The method of claim 1, and further comprising the step of drying said deagglomerated starch granules in the presence of protein to promote coating of said starch granules with said protein.

14. The method of claim 13, wherein said drying is spray drying.

15. A product produced by the process of claim 1.
16. A product produced by the process of claim 2.
17. A product produced by the process of claim 3.
18. A product produced by the process of claim 4.
19. A product produced by the process of claim 5.
20. A product produced by the process of claim 6.
21. A product produced by the process of claim 7.
22. A product produced by the process of claim 8.
23. A product produced by the process of claim 9.
24. A product produced by the process of claim 10.
25. A product produced by the process of claim 11.
26. A product produced by the process of claim 12.
27. A product produced by the process of claim 13.
28. A product produced by the process of claim 14.
29. A protein-coated starch product.
30. The protein-coated starch product of claim 29 wherein the starch is rice starch.

* * * * *